United States Patent
Miyano et al.

(10) Patent No.: US 6,772,484 B2
(45) Date of Patent: Aug. 10, 2004

(54) MOUNTING STRUCTURE FOR MOUNTING A RESIN MOLDED ARTICLE TO A BODY PANEL

(75) Inventors: Tetsuya Miyano, Aichi-ken (JP);
Daiichiro Kawashima, Aichi-ken (JP);
Tomokazu Nishikawa, Aichi-ken (JP);
Sadao Nada, Aichi-ken (JP);
Moriyoshi Takagi, Aichi-ken (JP);
Toshiro Shibagaki, Aichi-ken (JP)

(73) Assignee: Toyoda Gosei Co., LTD, Aichi-ken (JP)

(*) Notice: Subject to any disclaimer, the term of this patent is extended or adjusted under 35 U.S.C. 154(b) by 0 days.

(21) Appl. No.: 09/963,801

(22) Filed: Sep. 27, 2001

(65) Prior Publication Data

US 2002/0037389 A1 Mar. 28, 2002

(30) Foreign Application Priority Data

Sep. 28, 2000 (JP) .................................... 2000-297206
Sep. 29, 2000 (JP) .................................... 2000-300535
Aug. 7, 2001 (JP) .................................... 2001-239683

(51) Int. Cl.$^7$ ............................................. G04F 19/02
(52) U.S. Cl. ........................ 24/297; 24/576; 24/458; 411/508; 411/913; 428/100; 428/717.1
(58) Field of Search ........................ 24/297, 576, 458; 411/508, 913; 428/100, 99, 31, 122; 52/717.1, 718.01, 718.1, 717.03

(56) References Cited

U.S. PATENT DOCUMENTS

| | | | | |
|---|---|---|---|---|
| 3,897,967 A | * | 8/1975 | Barenyi ....................... 293/120 |
| 4,122,583 A | * | 10/1978 | Grittner et al. ............. 24/703.1 |
| 4,268,079 A | * | 5/1981 | Nomura et al. ............. 293/120 |
| 5,110,650 A | * | 5/1992 | Kessler ........................ 428/100 |
| 5,202,172 A | * | 4/1993 | Graf ............................ 428/100 |
| 5,353,571 A | * | 10/1994 | Berdan et al. ............. 52/716.5 |
| 5,546,637 A | * | 8/1996 | Niedecker ................. 24/30.5 R |
| 5,671,513 A | * | 9/1997 | Kawahara et al. ........ 24/581.11 |
| 6,102,473 A | * | 8/2000 | Steininger et al. .......... 296/209 |
| 6,449,814 B1 | * | 9/2002 | Dinsmore et al. ............ 24/297 |
| 6,453,522 B1 | * | 9/2002 | Romero Magarino et al. ........................... 24/458 |

FOREIGN PATENT DOCUMENTS

| | | |
|---|---|---|
| JP | 03-028042 | 2/1991 |
| JP | 10-086765 | 4/1998 |

* cited by examiner

*Primary Examiner*—Robert J. Sandy
*Assistant Examiner*—Dinesh N Melwani
(74) *Attorney, Agent, or Firm*—Posz & Bethards, PLC

(57) ABSTRACT

A high-strength mounting structure is used for attaching a resin article to a body panel. The resin molded article has an elongated main body and a pair of mount ribs formed in several spots intermittently in a longitudinal direction. A protrusion is provided at a distal end of each of the mount ribs. A clip has latch claws for engaging the protrusions of the mount ribs, and a slip-proof lug is located opposite to each latch claw to resist release the latch claws from the protrusions. In addition, the clip has an engagement section engaged with a body panel at a side facing the body panel.

6 Claims, 33 Drawing Sheets

MOUNTING STRUCTURE FOR MOUNTING A RESIN MOLDED ARTICLE TO A BODY PANEL

CROSS-REFERENCES TO RELATED APPLICATIONS

The present application claims priority under 35 U.S.C. §119 to Japanese Patent Application No. 2000-297206, filed Sep. 28, 2000, entitled "MANUFACTURING METHOD AND MOUNTING STRUCTURE OF SIDE BRAID", Japanese Patent Application No. 2000-300535, filed Sep. 29, 2000, entitled "MOUNTING STRUCTURE OF CLIP TO RESIN MOLDED ARTICLE" and Japanese Patent Application No. 2001-239683, filed Aug. 7, 2001, entitled "MANUFACTURING METHOD AND MOUNTING STRUCTURE OF SIDE BRAID". The contents of this application are incorporated herein by reference in their entirety.

BACKGROUND OF THE INVENTION

1. Field of the Invention

The present invention relates to a mounting structure of a clip for mounting a resin molded article at a position where decoration is provided in a vehicle or the like, to a resin molded article, and a mounting structure and manufacturing method of the resin molded article.

2. Discussion of the Background

Conventionally, in a vehicle, an aircraft, and a ship or the like, a variety of resin molded articles considered in decorative properties are mounted on a surface of a body or the like. For example, a side braid having its superior decorative properties, and being capable of protecting a door, is used for a side door or the like of automobile. This side braid is mounted to a body panel of the door via a clip.

Amounting structure of a clip to the side braid, for example, as shown in FIG. 32A, includes a mounting structure (prior art 1) or the like in which a mount stay 94 is provided on a back side face 911 of a side braid 91, a clip 95 engaged with a body panel 92 is provided at the mount stay 94, and the side braid 91 is mounted to the body panel 92, and the like.

However, as shown in FIG. 32B, in the prior art 1, as described above, the mount stay 94 is provided, and the inside of the mount stay 94 is formed in a hollow shape. Namely, upon the molding of the side braid 91, in order to form the mount stay 94, a slide core 961 is provided along the hollow shape in the molding die 96.

Then, during molding of the side braid 91, after injection-molding has been carried out, when the side braid 91 is removed, it is required to slide the slide core 961 in a longitudinal direction before removing the side braid 91 while. In the case where such a slide core 961 is employed, a sink mark 913 may occur at the periphery during molding (refer to FIG. 32A), and there is an apprehension that the appearance characteristics of the design surface of the side braid 91 may be lowered.

In order to solve such problems, as shown in FIG. 33, there is a method (prior art 2) which is when forming the mount stay 94, blowing gas 97 at a position at which the mount stay 94 is to be provided instead of the slide core 961, thereby molding the side braid 91. According to this method, an occurrence of the sink mark 913 caused by the slide core 961 can be restrained.

However, in the prior art 2, a manufacturing apparatus including a molding die for molding the side braid 91 becomes complicated, resulting in an increase in production cost of the side braid 91.

SUMMARY OF THE INVENTION

An object of the present invention is to provide a mounting structure of a clip to a resin molded article and a mounting structure and manufacturing method of the resin molded article, with the high mount strength of the structures and capable of easily manufacturing a resin molded article having its excellent design surface.

According to one aspect of the present invention, there is provided a manufacturing method of a resin molded article having a plurality of clip mounting sections, each of which constructed by erecting a pair of mount ribs having a latched section provided thereon from the back face of a main body, intermittently along a longitudinal direction, the manufacturing method including employing a lower die that corresponds to a shape of a back side face having the clip mounting section provided thereon and an upper die that corresponds to a shape of a top side face of the resin molded article, wherein the lower die has a stationary section, a first moving section movable relatively to the stationary section, and a secondary moving section movable relatively to the stationary section or the first moving section, and wherein the stationary section or the first moving section has a molding face having provided thereon an undercut portion for molding the latched section; carrying out injection-molding in a cavity formed by the lower die and upper die, thereby molding the resin molded article; releasing the upper die from the lower die; moving the first moving section, thereby forming a space inside or outside of a pair of the mount ribs at the clip mounting section; and moving the second moving section, thereby removing the latched section from the undercut portion while elastically deforming the mount ribs in a direction of the space.

In the present invention, first, a cavity for molding the main body and a pair of mount ribs at the clip mounting section is formed by the lower die and the upper die. In addition, the mold portion of each clip mounting section in this cavity is constructed by being surrounded by a face for molding an outside face of the mount ribs at the stationary section or the first moving section and a face for molding an inside face of the mount rib at the stationary section or the first moving section.

The cavity is subjected to injection-molding, thereby molding a resin molded article in which a plurality of clip mounting sections consisting of a pair of mount ribs is provided.

Next, the upper die is released from the lower die, thereby forming a space in which at least either one of the first moving section and second moving section and the resin molded article can rise upward of the lower die.

Then, at the lower die, the first moving section is moved relatively to the stationary section At this time, either one of the face for molding the outside face of the mount rib formed at the stationary section or the first moving section and the face for molding the inside face of the mount rib is released from the outside face or inside face of a pair of the molded mount ribs. Then, a space is formed at the inside or outside of the pair of the mount ribs.

In addition, the second moving section is moved relatively to the stationary section or first moving section so as to lift the resin molded article on which the second moving section has been molded.

At this time, the resin molded article moves in a direction of the upper die to be released from the stationary section of the lower die. Then, by the face for molding the remaining face of the outside face of the mount rib formed at the stationary section or the first moving section and the inside face of the mount rib, the mount rib is elastically deformed in a direction of the space, and a latched section of the mount rib is unlatched from an undercut portion formed at the stationary section or the first moving section.

Then, the mount ribs of the molded resin molded article are released from the stationary section or the first moving section, and the resin molded article is removed from the lower die.

Namely, according to a conventional manufacturing method, in order to release a shape portion such as the latched section from the undercut portion, and remove the resin molded article from the lower die, the movement in a transverse direction is required in the lower die. On the other hand, in the present invention, the mount rib is elastically deformed, and the resin molded article is forcibly pulled out in a direction of the upper die.

Thus, the movement in the lower die may be limited to the movement in a direction opposite to the upper die of the first moving section and the second moving section. Therefore, an apparatus for manufacturing a resin molded article including the lower die and upper die can be simplified.

In addition, in the manufacturing method according to the present invention, upon molding of a resin molded article, a movement of the first moving section and second moving section are limited to a movement in a direction opposite to a back side face of the resin molded article, and there is no need to slide the back side face of the resin molded article in a transverse direction. Thus, unlike a conventional example, a slide core provided at the lower die does not slide on the back side face of the resin molded article, and a sink mark does not occur on the design surface of the resin molded article. Therefore, a resin molded article having its excellent design surface can be manufactured.

It is difficult to mold a resin molded article having a plurality of clip mounting sections by carrying out the conventional extrusion-molding. On the other hand, in the present invention, molding is carried out by injection-molding, and thus, a resin molded article having a clip mounting section can be molded easily.

In the resin molded article, a clip described later is mounted at a portion at which the mount ribs are provided. Then, the resin molded article is mounted to a body panel of a vehicle via this clip, According to another aspect of the present invention, there is provided a manufacturing method of a resin molded article that has an elongated main body and a plurality of clip mounting sections formed intermittently along a longitudinal direction, each of which is composed of a pair of mount ribs facing to each other, wherein a protrusion protruded outwardly on outside faces that do not face to each other is provided at the tip, the manufacturing method including employing a lower die that corresponds to a shape of a back side face having the clip mounting section provided thereat and an upper face that corresponds to a shape of a top side face of the resin molded article, wherein the lower die has a stationary section, a first moving section movable relatively to the stationary section in a direction of the upper die, and a second moving section movable relatively to the stationary section to be further distant than movement of the first moving section in the direction of the upper die, and wherein the first moving section has a molding face having an undercut portion for molding an outside face of the mount rib and the protrusion; carrying out injection-molding in a cavity formed by the lower die and upper die, thereby molding the resin molded article; releasing the upper die from the lower die moving the first moving section, thereby forming a space between a pair of the mount ribs at the clip mounting section; and moving the second moving section, thereby removing the protrusion from the undercut portion while elastically deforming the mount rib in a direction of the space.

The noticeable point in the present invention is to provide a manufacturing method of a resin molded article, wherein the first moving section and the second moving section that are movable in a mold-release direction is employed and a slide core that slides in a longitudinal direction of the resin molded article is not employed; the method includes forming the space between the mount ribs by moving the first moving section and removing the protrusion from the undercut portion while elastically deforming the mount ribs in a direction of the space by moving the second moving section.

In the present invention, first, a cavity for molding a main body and a pair of mount ribs at a clip mounting section is formed by a lower die and an upper die. In addition, the mold portion of each clip mounting section in the cavity is constructed by being surrounded by a face for molding the outside face of the mount rib at a first moving section and a face positioned between the molding face and the first moving sections, the face molding an inside face of a mount rib at the stationary section of the lower die.

Then, the cavity is subjected to injection-molding, thereby molding a resin molded article in which clip mounting sections each consisting of a plurality of pairs of mount ribs are provided.

Next, the upper die is released from the lower die, thereby forming a space wherein the first moving section, second moving section, and resin molded article can rise upwardly of the lower die.

Next, the first moving section is moved relatively to the stationary section of the lower die in a direction of the upper die. At this time, the resin molded article moves in a direction of the upper die to be released from the stationary section of the lower die, and a face for molding the inside face of the mount rib at the stationary section of the lower die is released from the inside face of the pair of the molded mount ribs. And a space is formed between the inside faces of the pair of the mount ribs.

It is preferable that, when the first moving section is moved, the second moving section be moved at the same time. In this case, a tip end of the second moving section is not released from the resin molded article. Thus, when the second moving section is moved further, the tip end of the second moving section does not abut against the resin molded article with shock.

Next, the second moving section is moved further than movement of the first moving section in a direction of the upper die. At this time, the mount ribs are elastically deformed in a direction of the space by the face for molding the outside face of the mount ribs of the first moving sections, and a protrusion of the molded mount rib is removed from the undercut portion of the first moving section. Then, the mount ribs are moved from the first moving sections, and the resin molded article is removed from the first moving section.

Namely, according to the conventional manufacturing method, as in the protrusion, the movement in a transverse direction in the lower die is required in order to remove the portion that protrudes in a transverse direction from the lower die. On the other hand, in the present invention, the mount ribs of the resin molded article that is a molding article are elastically deformed, and the resin molded article is forcibly pulled out in a direction of the upper die.

Thus, the movement in the lower die may be limited to the movement in a direction of the upper die by the first moving section and the second moving section. Therefore, an apparatus for manufacturing a resin molded article including the lower die and upper die can be simplified.

In the manufacturing method according to the present invention, upon molding of a resin molded article, a movement of the first moving section and the second moving section are limited to a movement in a direction opposite to a back side face of the resin molded article, and there is no need to slide the back side face of the resin molded article in a transverse direction. Thus, unlike a conventional example, a slide core provided at the lower die does not slide on the back side face of the resin molded article, and a sink mark does not occur on the design surface of the resin molded article. Therefore, a resin molded article having its excellent design surface can be manufactured.

It is difficult to mold a resin molded article having a plurality of clip mounting sections by carrying out the conventional extrusion-molding. In contrast, in the present invention, molding is carried out by injection-molding, and thus, a resin molded article having a clip mounting section can be easily molded.

In addition, in the resin molded article, a clip described later is mounted at a portion at which the mount ribs are provided. Then, the resin molded article is mounted to a body panel of a vehicle via this clip.

According to another aspect of the present invention, there is provided a manufacturing method of a resin molded article that has an elongated main body and a plurality of clip mounting sections formed intermittently along a longitudinal direction, each of which is composed of a pair of mount ribs facing to each other, wherein a protrusion protruded outwardly on outside faces which do not face to each other is provided at the tip, the manufacturing method including employing a lower die that corresponds to a shape of a back side face at which the clip mounting section is provided and an upper die that corresponds to a shape of a top side face of the resin molded article, wherein the lower die has a stationary section having a molding face on which an undercut portion for molding the protrusion is provided, a first moving section molding inside faces of the mount ribs face to each other and being movable relatively to the stationary section in a direction opposite to the upper die, and a second moving section movable relatively to the stationary section in a direction of the upper die; carrying out injection-molding in a cavity formed by the lower die and the upper die, thereby molding the resin molded article; releasing the upper die from the lower die; moving the first moving section, thereby forming a space between a pair of the mount ribs at the clip mounting section; and moving the second moving section, thereby removing the protrusion from the undercut portion while elastically deforming the mount rib in a direction of the space.

In the present invention, first, a cavity for molding a pair of mount ribs at a main body and a clip mounting section is formed by a lower die and an upper die. In addition, the mold portion of each clip mounting section in the cavity is constructed by being surrounded by a face for molding an outside face of a mount rib at the stationary section and a face for molding an inside face of the mount rib at the first moving section.

Then, the cavity is subjected to injection-molding, thereby molding a resin molded article in which a plurality of clip mounting sections each consisting of a pair of mount ribs are provided.

Next, the upper die is released from the lower die, thereby forming a space in which the second moving section and resin molded article can rise upwardly of the lower die.

Next, the first moving section is moved relatively to the stationary section of the lower die in a opposite direction of the upper die. At this time, a face for molding the inside face of the mount rib at the first moving section is released from the inside face of the pair of the molded mount ribs. And a space is formed between the inside face of the pair of the mount ribs.

Next, the second moving section is moved relatively to the stationary section of the lower die in a direction of the upper die. At this time, the mount ribs are elastically deformed in a direction of the space by a face for molding an outside face of the mount ribs of the stationary section, and the protrusion of the molded mount ribs is removed from the undercut portion of the stationary section. Then, the mount ribs are moved from the stationary section, and the. resin molded article is removed from the stationary section.

In the present invention, the movement in the lower die may be limited to the movement of the first moving section and second moving section in a direction opposite to the upper die. Thus, as in the foregoing description, an apparatus for manufacturing a resin molded article including the lower die and the upper die can be simplified. In addition, as in the foregoing description, a resin molded article having its excellent design surface can be manufactured.

According to still another aspect of the present invention, there is provided a clip mounting structure of mounting clip a to a resin molding article having a clip mounting section constructed by erecting a pair of mount ribs from a back fare of the main body, wherein the clip has outer lugs for supporting the mount ribs from the outside and inner lugs for supporting the mount ribs from the inside, and at either the outer lug or the inner lug has a latch section capable of being latched by a latched section, and wherein the clip pinches the mount ribs by the outer lugs and the inner lugs, and latches the latch section on the latched section to be mounted on the resin molded article.

In the present invention, the clip has the latch section at either one of the outer lug and the inner lug, whereas the mount ribs each have the latched section. Namely, the outer lugs, the inner lugs and the mount ribs are provided to be erected in a direction in which the clip and the resin molded article faces to each other.

Therefore, in molding the resin molded article, the conventional molding die using a side core need not be used for the purpose of molding a mount rib. Namely, an undercut portion for molding the latched section of the mount rib is provided at the molding die for molding the resin molded article in the present invention. Then, after resin solidification, a molding die with a forcible removal structure for forcibly removing a mount rib by being elastically deformed by the molding die is used in order to remove the latched section from the undercut portion. Therefore, a molding die structure is simple, and the resin molded article can be easily manufactured.

Upon molding of the resin molded article having the mounting structure, movement of the molding die is limited to movement in a direction opposite to the back face of the resin molded article, and there is no need to slide on the back face of the resin molded article in a transverse direction. Therefore, unlike the conventional example, the slide core provided at a molding die does not slide on the back face of the resin molded article such as side braid or a sink mark does not occur on the design surface of the resin molded article. Therefore, a resin molded article having its excellent design surface can be manufactured.

In addition, the mount rib is pinched by means of the outer lug and inner lug, and the latch section is latched on the latched section, whereby the clip is mounted to the resin molded article. Thus, when the clip is mounted to the resin molded article, the latch section is latched on the latched section, and thus, the clip cannot be easily removed from the resin molded article. Therefore, the clip mounting structure in the present invention has a high mount strength.

As has been described, according to the present invention, a resin molded article having its excellent design surface can be easily manufactured, and there can be provided a mounting structure of a clip to a resin molded article with its high mount strength.

According to still another aspect of the present invention, there is provided a clip mounting structure of mounting a clip to a resin molded article in which a pair of mount ribs are erected from a back face of a main body, wherein the clip has outer lugs for supporting the mount ribs from the outside and inner lugs for supporting the mount ribs from the inside, and, at a tip end of either one of the outer lug and the inner lug, has protrusions protruded inwardly and facing to each other, wherein the mount ribs each has a latch face latched on the protrusion, and wherein the clip pinches the mount ribs by the outer lugs and the inner lugs, and latches the protrusion on the latch face to be mounted on the resin molded article.

In the present invention, the clip has the protrusion at either one of the outer lugs or the inner lugs, while the mount rib has the latch face. Namely, the outer lug, the inner lug and the mount rib are provided to be erected in a direction in which the clip and resin molded article face to each other.

Therefore, when the resin molded article is molded, the conventional molding die using a side core need not be used for the purpose of molding a mount rib. Namely, a protrusive section for molding the latch face of the mount rib is provided at the molding die for molding the resin molded article in the present invention. Then, after resin solidification, in order to remove the protrusive section from the latch face, there is used a molding die with a forcible removal structure for elastically deforming the mount rib by a molding die, thereby forcibly removing the mount rib (refer to FIG. 14 to FIG. 16). Thus, the structure of the molding die is simple, and the resin molded article can be easily manufactured.

Upon molding of the resin molded article having the mounting structure, movement of the molding die is limited to movement in a direction opposite to the back face of the resin molded article, and there is no need to slide the back face of the resin molded article in a transverse direction. Thus, unlike a conventional example, a slide core provided at the molding die does not slide on the back face of the resin molded article such as side braid, and a sink mark does not occur on the design surface of the resin molded article. Therefore, there can be manufactured a resin molded article having its excellent design surface.

The mount rib is pinched by the outer lug and the inner lug, and a protrusion is latched on a latch face, whereby the clip is mounted to the resin molded article. Thus, when the clip is mounted to the resin molded article, the protrusion latches the latch face, and the clip cannot be easily removed from the resin molded article. Therefore, the clip mounting structure in the present invention has a high mount strength.

As has been described above, according to the present invention, a resin molded article having its excellent design surface can be easily manufactured, and there can be provided the mounting structure of the clip to the resin molded article with its high mount strength.

According to the other aspect of the present invention, there is provided a mounting structure of a resin molded article; wherein the resin molded article has an elongated main body, and a plurality of clip mounting sections formed intermittently along a longitudinal direction, each clip mounting section is composed of a pair of mount ribs facing to each other, each mount rib has a protrusion protruded outward of an outside face that does not face to each other at the tip; the resin molded article is mounted to a body panel via a clip corresponding to a position of the mount ribs, wherein the clip has a latch claw to be latched on the protrusion of the mount rib, a slip-proof lug provided opposite to the latch claw so as not to slip the latch claw from the protrusion, and an engagement portion engaged with the body panel at a side opposite to the body panel; and the latch claw of the clip is latched at the protrusion of the mount rib to be mounted to the resin molded article, and the engagement portion of the clip is mounted to the body panel, thereby mounting the resin molded article to the body panel.

In the present invention, the resin molded article has a plurality of clip mounting sections formed intermittently. Thus, when a clip is mounted to the resin molded article, its mount position can be easily fixed, and the clip is mounted easily When the resin molded article is mounted on the body panel, the clip is interposed. The clip latches its latch claw at a protrusion at the mount rib of the resin molded article to be mounted to the resin molded article.

The clip is assisted so as not to slip latching of the latch claw on the protrusion due to the slip-proof lug. Thus, when the resin molded article is mounted to the body panel by means of an engagement portion of the clip, the latch claw is latched at the protrusion, and thus, the resin molded article cannot be removed easily. Therefore, the mounting structure of the resin molded article is rigid, although the clip other than the resin molded article is used.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENTS

Figure 1:
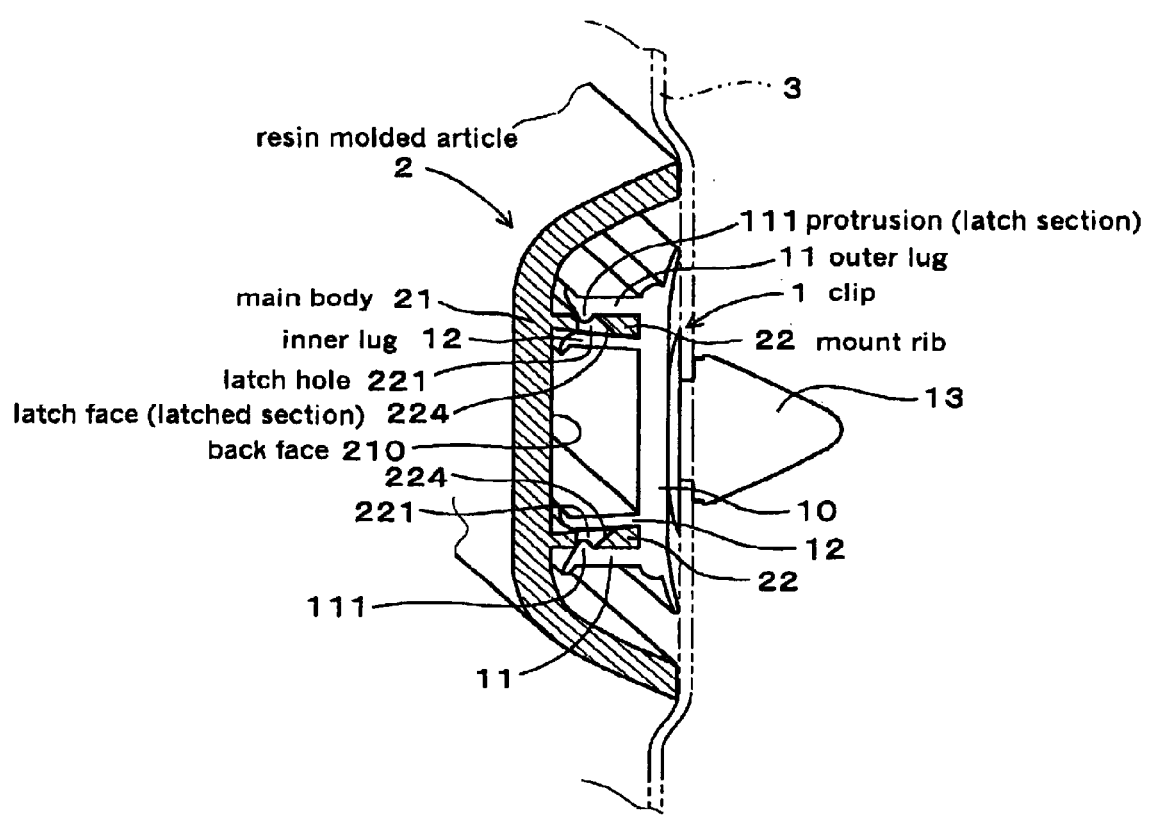
FIG. 1 is an illustrative view illustrating a clip mounting structure to a resin molded article in Embodiment 1.

In a clip mounting structure of a clip to the resin molded article and a mounting structure and manufacturing method of a resin molded article, the resin molded article can be used for a variety of braids mounted to an outer panel at the outside of a automobile vehicle or a variety of garnishes mounted to the inside of the vehicle, in particular. In addition, the article can be used in a variety of vehicles, aircraft, ships or the like as well as automobile.

The latch face can be provided at a through hole as described later or can be provided in a groove or in a bottomed hole.

Next, in a mounting structure of a clip to the resin mount article, it is preferable that, at the mount rib, the latch face is a face at the tip end side of a through hole inclined so that the size of a hole is reduced toward a latch side face at a side facing to the protrusion.

In this manner, when a resin molded article is removed from a molding die, the latch face is prone to slip on an inclined face of a protrusive section of a molding die to which the latch face faces, and the mount rib is elastically deformed by a molding die, thereby making it easy to remove the mount rib forcibly.

In addition, an angle between a latch face and a latch side face is acute, the tip end formed by these faces is engaged with a corner of protrusion, and protrusion can be easily latched on a latch face.

Next, it is preferable that the protrusion is provided at the outer lug, and that the latch face is latched from the outside of the pair of mount ribs.

In this manner, a clip can be easily mounted to a resin molded article.

Next, it is preferable that, at the latch face, an inclined angle between the latch face and the latch side face is 15 to 25 degrees.

In this manner, an angle between a latch face and a latch side face is acute, a tip end portion formed by the latch face and latch side face is engaged with a corner of protrusion in a clip, and protrusion can be easily and rigidly latched.

In the case where the inclined angle is less than 15 degrees, there is an apprehension that an angle between the latch face and a latch side face is too acute, and the strength of the latch face is weak.

On the other hand, in the case where the inclined angle exceeds 25 degrees, when a mount rib is removed from a molding die during molding of a resin molded article, it is difficult for the latch face to slip on the inclined face at the protrusive section of a molding die facing to the inclined face, thereby making it difficult to deform elastically and remove the mount rib forcibly.

Next, it is preferable that, at the mount rib, an opposite side face opposite to the latch side face is inclined so that the thickness of a root is reduced as compared with the thickness of the tip end of the mount rib.

In this manner, the mount rib is easily elastically deformed at its root. When a mount rib is removed from a molding die during molding of the resin molded article, the mount rib is elastically deformed, thereby making it possible to remove the rib forcibly.

Next, it is preferable that, at the mount rib, the thickness of the root is ⅓ or less of the thickness of the main body of the resin molded article.

In this manner, the mount rib is elastically deformed more easily at its root. When the mount rib is removed from the molding die during molding of the resin molded article, the mount rib is elastically deformed, thereby making it more easy to remove the mount rib forcibly. In addition, if the thickness of the root is extremely small, the strength is lowered, and thus, it is preferable that the thickness is 0.7 mm or more.

Next, it is preferable that tip end faces of the outer lug and the inner lug are inclined at a side in which the tip end faces face to each other.

In this manner, when the clip is mounted to the resin molded article, the tip end of the mount rib abuts against the tip end face on which the outer lug and inner lug are inclined, the mount ribs are easily guided between them, and a protrusion can be easily latched on the latch face.

In a mounting structure of the resin molded article, it is preferable that the mount rib and/or the latch claw has a position-fixing section for fixing a position of the clip in the longitudinal direction of the resin molded article.

In this manner, the position of the clip in the longitudinal of the resin molded article is securely fixed. Thus, after the resin molded article has been mounted to the body panel, the resin molded article can be prevented from being displaced in the forward and backward directions of the vehicle.

Next, it is preferable that a reinforcement rib for improving the strength of the resin molded article is provided at an end in the longitudinal direction of the mount rib, and that the reinforcement rib is inclined in the longitudinal direction so that a width between the reinforcement ribs becomes narrow toward the tip end.

The resin molded article becomes rigid caused by the reinforcement rib, and is hardly deformed after being mounted to the body panel.

The reinforcement ribs are inclined toward the longitudinal direction so that a width between these ribs become narrow toward the tip end. Thus, when a resin molded article is subjected to injection-molding, materials can be smoothly supplied toward the longitudinal direction of the resin molded article. Therefore, the resin molded article can be easily molded Next, it is preferable that the clip has reinforcement sections facing to the inside faces of the mount ribs facing to each other at a side facing to the resin molded article.

The strength of the clip is improved by the reinforcement section, and the reinforcement section abuts against the inside face of the mount rib of the resin molded article after mounted to the resin molded article, thereby making it possible to prevent elastic deformation of the mount ribs. Therefore, the mount strength between the resin molded article and clip can be improved more.

Next, it is preferable that the clip has a pair of guide sections having an interval equal to or greater than an interval between the protrusions of the pair of the mount ribs at a side facing to the resin molded article, and the guide section protrudes further than the latch claw.

In this manner, when the clip is mounted to the resin molded article, the guide section of the clip abuts against the protrusion before the clip latch claw abuts against the protrusion, and can guide from the outside of the protrusion so that the protrusion does not open to the outside. Thus, the mount ribs of the resin molded article can be prevented from being escaped to the outside by avoiding a latch between the protrusion and latch claw. Therefore, the clip latch claw can be easily latched at a protrusion at the mount rib of the resin molded article.

Next, it is preferable that the pair of the mount ribs each has a groove that corresponds to the width of the clip, that the clip is engaged with the groove, and that the position of the clip relevant to the longitudinal direction of the resin molded article is fixed.

In this manner, the position of the clip relevant to the longitudinal direction of the resin molded article is securely fixed. Thus, after the resin molded article has been mounted to the body panel, the resin molded article can be prevented from being displaced in the forward and backward directions of the vehicle.

Next, it is preferable that the protrusion has a stepped section further protruded outwardly in the vicinity of at least one end in the longitudinal direction.

In this manner, when the latch claw of the clip is latched at the protrusion in the resin molded article, this latch claw abuts against the stepped section, making it possible to carry out positioning in longitudinal direction.

Next, it is preferable that an inclined face is provided between the stepped section and the end, wherein a protrusion quantity is gradually reduced as the protrusion is closer from the stepped section to the end.

In this case, when the clip is mounted to a resin molded article, the clip latch claw can be mounted to be slipped in the longitudinal direction from the side of the end toward the side of the stepped section on the inclined face of the mount rib. Then, after the latch claw has been over the stepped section, the latch claw abuts against the stepped section, thereby making it possible to ensure positioning in the longitudinal direction.

EMBODIMENTS

Embodiment 1

A mounting structure of a clip to a resin molded article according to the illustrative embodiment of the present invention will be described with reference to FIG. 1 to FIG. 8.

As shown in FIG. 1, in a mounting structure of a clip 1 to a resin molded article 2 in the present embodiment, the clip 1 is mounted to the resin molded article 2 in which a pair of mount ribs 22 is erected from a back face 210 of a main body 21.

Each clip 1 has an outer lug 11 for supporting the mount ribs 22 from the outside and an inner lug 12 for supporting them from the inside. In addition, at the tip end of the outer lug 11, a protrusion 111 is provided as a latch section at which the outer lug 11 and the inner lug 12 are protruded inwardly so as to face to each other. On the other hand, each of the mount ribs 22 has a latch hole 221 having a latch face 224 that serves as a latched section to be latched at a protrusion 111.

The protrusion 111 latches the latch face 224 from the outside of the pair of mount ribs 22. In addition, the clip 1 pinches the mount ribs 22 by means of the outer lugs 11 and the inner lug 12, and latches the protrusion 111 at the latch face 224 of the latch hole 221 to be mounted to the resin molded article 2.

In the present embodiment, the resin molded article 2 is a side braid to be mounted to a body panel 3 of an automobile door or the like.

A detailed description will be given below.

Figure 2A:
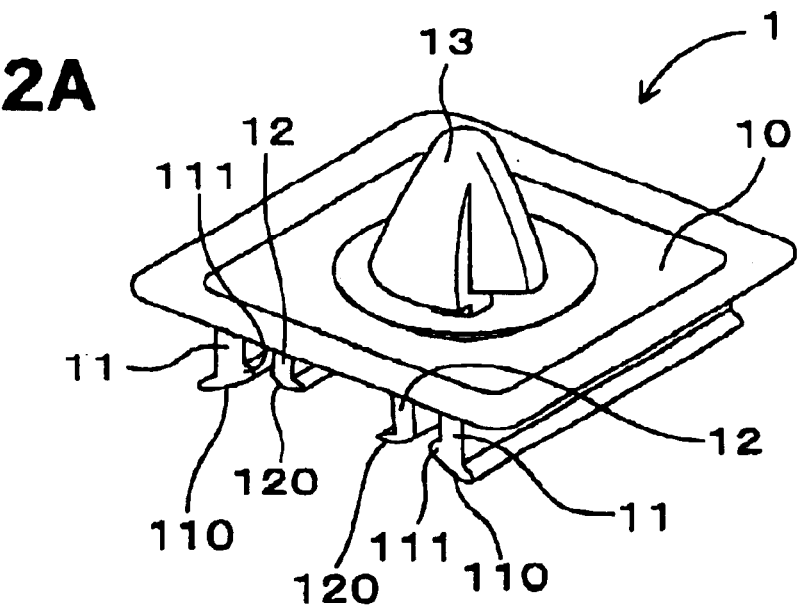
FIG. 2A is a perspective view showing a side of a clip facing to a body panel in Embodiment 1.

As shown in FIG. 2A, the clip 1 has a pair of outer lugs 11 and a pair of inner lugs 12 erected from a side of a base section 10, which faces to the resin molded article 2, and an engagement section 13 to be mounted on the body panel 3 is provided at the opposite side of the base section 10.

Figure 2B:
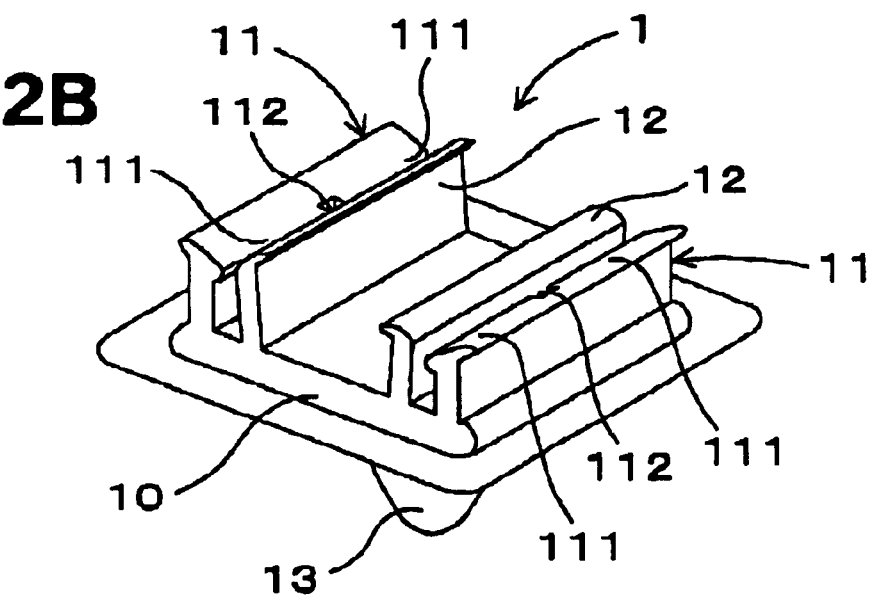
FIG. 2B is a perspective view showing a side of a clip facing to a resin molded article in Embodiment 1.

As shown in FIG. 2B, in the present embodiment, the protrusion 111 provided at the outer lug 11 is divided into two sections by a cutout section 112 that is cut out at a center portion in its lengthwise direction.

In addition, a tip end face 110 of the outer lug 11 and a tip end face 120 of the inner lug 12 are inclined to a side at which they face to each other.

Figure 3A:
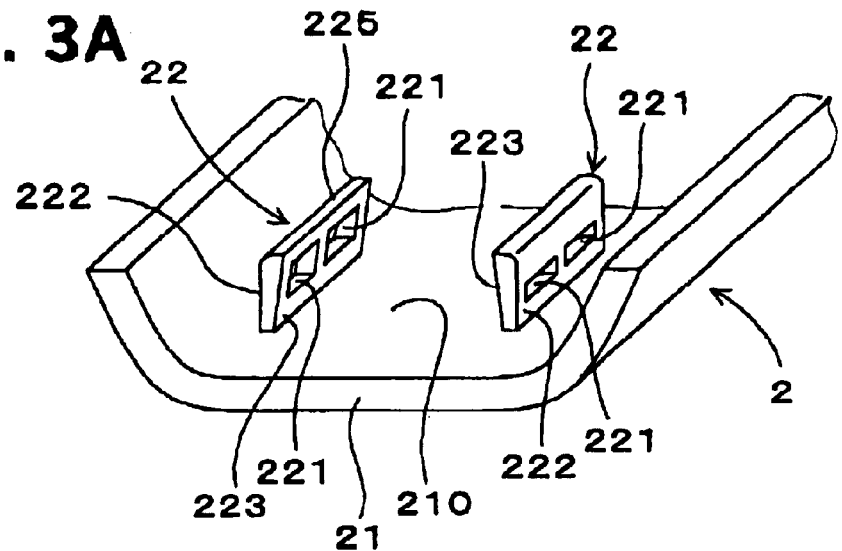
FIG. 3A is a perspective view showing aback face of a side braid in Embodiment 1.

As shown in FIG. 3A, a main body 21 of the resin molded article 2 has a U-shaped cross section at which its both ends are bent to the side of the back face 210, and is formed in an elongated shape.

A latch hole 221 of the mount rib 22 is formed to be divided into two sections in order to correspond to the protrusion 111 of the outer lug 11.

Figure 3B:
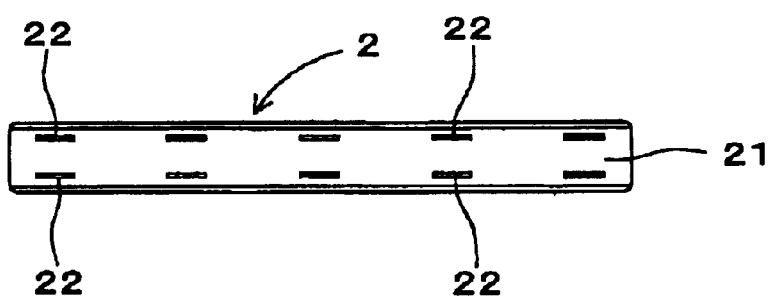
FIG. 3B is plan view showing disposition of a mount rib of the back face of the side braid in Embodiment 1.

As shown in FIG. 3B, a pair of mount ribs 22 formed in plurality spots intermittently along a longitudinal direction is provided at the back face 210 of the resin molded article 2.

Figure 3C:
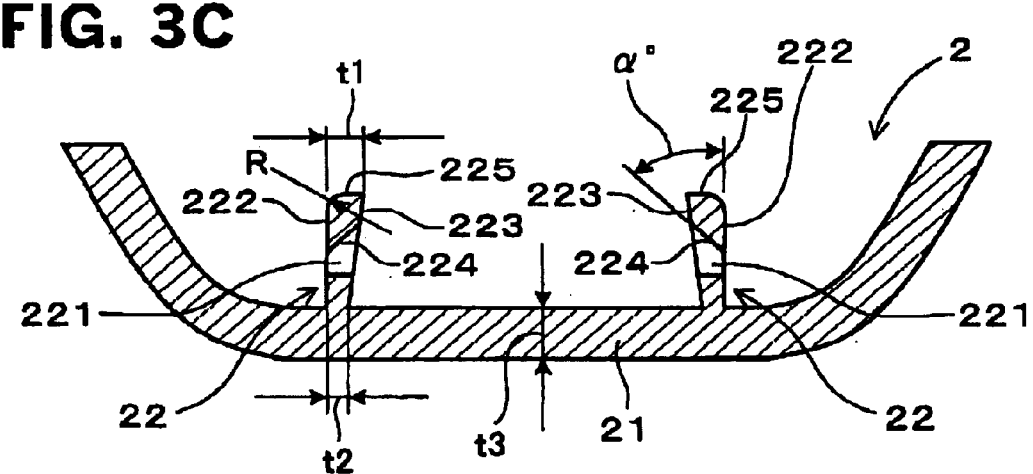
FIG. 3C is a sectional view of the side braid in Embodiment 1.

As shown in FIG. 3C, in the mount rib 22, the latch face 224 that is a face at the tip end 225 in the latch hole 221 is inclined toward a latch side face 222 facing the protrusion 111 so that the hole becomes smaller. An angle $\alpha$ between the latch face 224 and the latch side face 222 is set to be 20 degrees. In addition, the latch hole 221 is a through hole.

The mount rib 22 is inclined on an opposite side face 223 opposite to the latch side face 222 so that thickness "t2" of a root is smaller as compared with thickness "t1" of a tip end 225 of the mount rib 22. The thickness "t2" of this root is $\frac{1}{3}$ of thickness "t3" of the main body 21 of the resin molded article 2.

The tip end 225 of the mount rib 22 abuts against a side facing to the resin molded article 2 in the base section 10, thereby improving a mount strength between the clip 1 and the resin molded article 2. In addition, a corner between the tip end 225 of the mount rib 22 and the latch side face 222 is a round having a radius which is $\frac{1}{5}$ to $\frac{1}{2}$ relevant to thickness "t1" of the tip end 225. Thus, when the clip 1 is mounted to the resin molded article 2, the mount rib 22 can be easily guided between the outer lug 11 and the inner lug 12.

Figure 4:
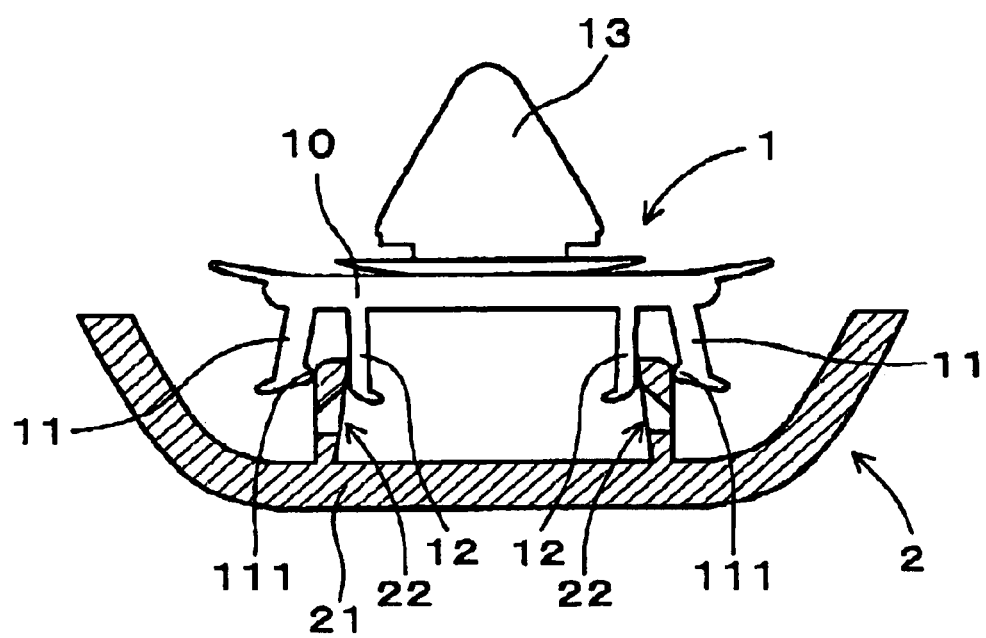
FIG. 4 is an illustrative view showing a state in which a clip is mounted to a resin molded article in Embodiment 1.

As shown in FIG. 4, when the clip 1 and the resin molded article 2 are assembled, the outer lug 11 and the inner lug 12 are elastically deformed each other. After they have been assembled, the outer lug 11, inner lug 12, and mount rib 22 return to a position before elastic deformation, and the protrusion 111 of the outer lug 11 latches the latch face 224 of the latch hole 221 of the mount rib 22.

Now, a manufacturing method of the resin molded article 2 will be described here.

Figure 5A:
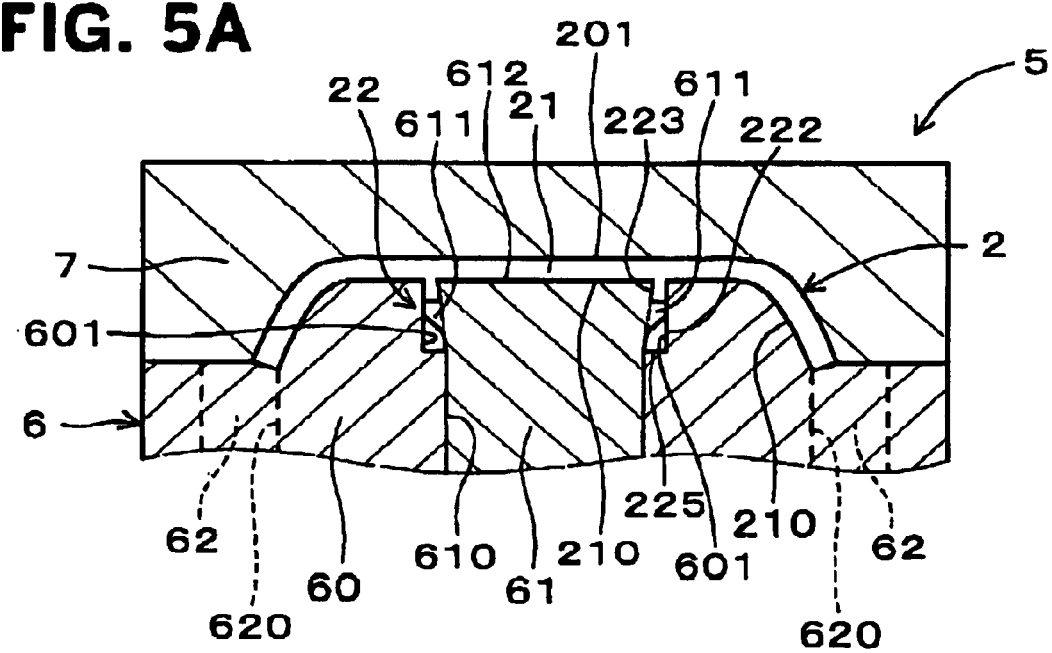
FIG. 5A is an illustrative view showing a state in which injection-molding is carried out in a molding die of the resin molded article in Embodiment 1.
Figure 5B:
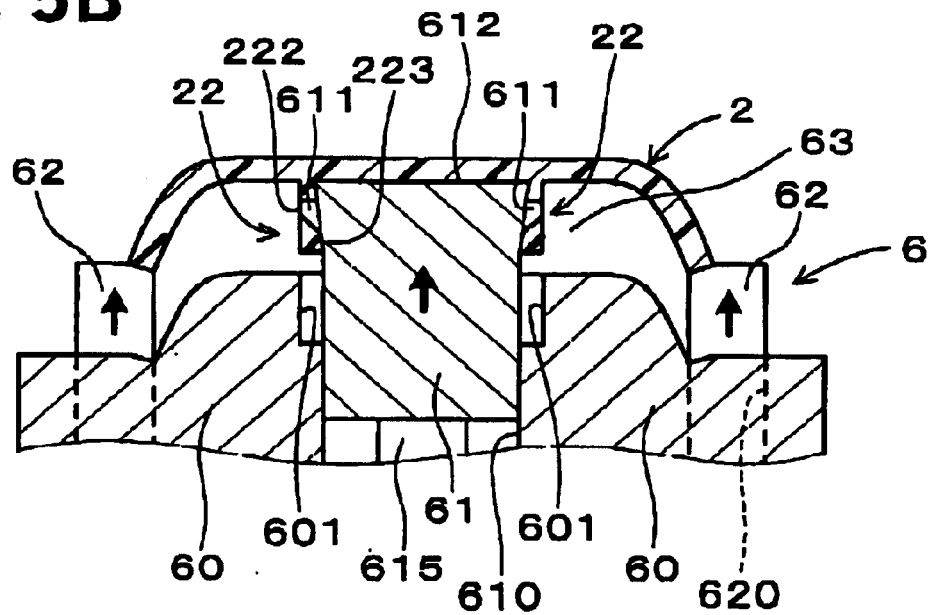
FIG. 5B is an illustrative view showing a state in which a first moving section and a second moving section are raised in a molding die of the resin molded article in Embodiment 1.
Figure 6A:
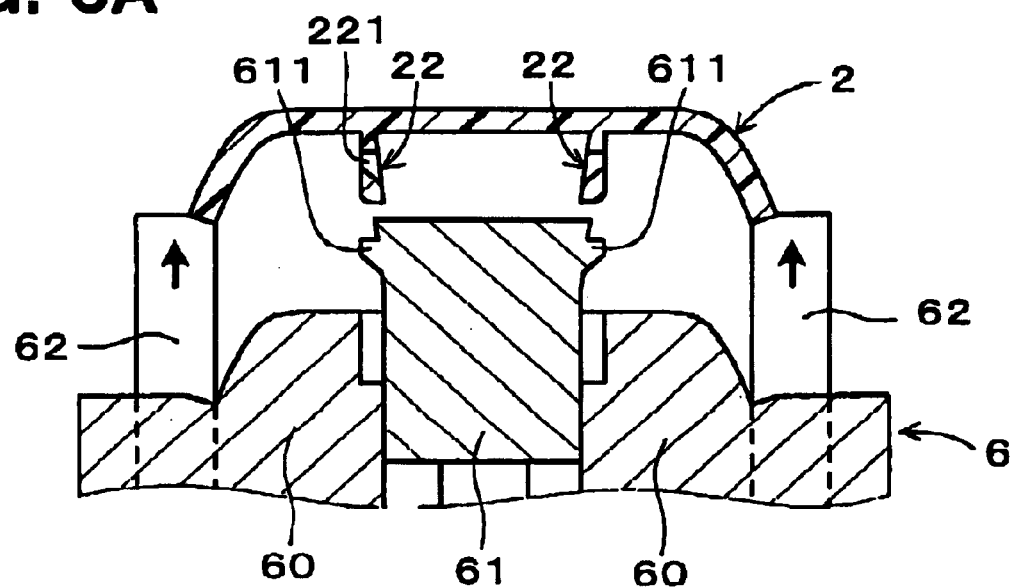
FIG. 6A is an illustrative view showing a state in which the second moving section is further raised in a molding die of the resin molded article.
Figure 6B:
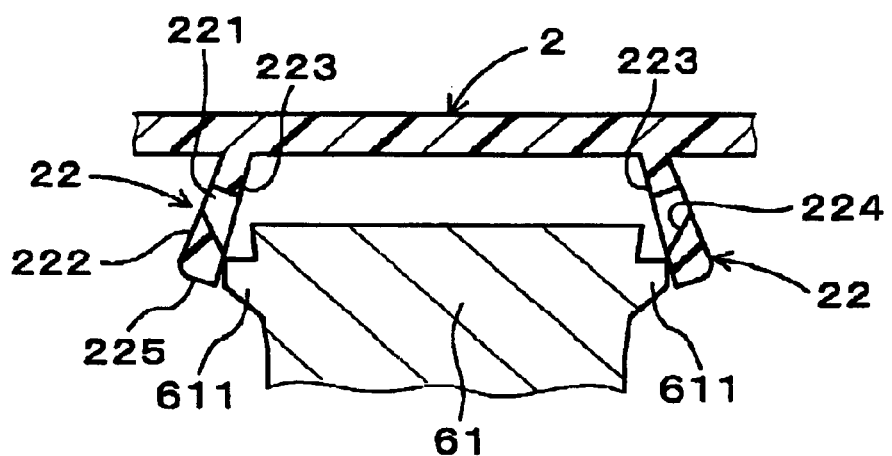
FIG. 6B is an illustrative view showing a state in which a protrusion is removed from an undercut portion while a mount rib is elastically deformed in a direction of a space in a molding die of the resin molded article in Embodiment 1.

As shown in FIG. 5A and FIG. 5B or FIG. 6A, in molding of the resin molded article 2, there are used a molding die 5 having a lower die 6 that corresponds to a shape of a back face 210 having the mount ribs 22 provided thereat and an upper die 7 that corresponds to a shape of the surface 201 of the resin molded article 2.

The lower die 6 has a stationary section 60, a first moving section 61 movable relative to the stationary section 60 in a direction of the upper die 7, and a second moving section 62 movable to be further than the movement of the first moving section 61.

A slide hole 610 for disposing and sliding the first moving section 61 and a slide hole 620 for disposing and sliding the second moving section 62 are provided at the stationary section 60.

The first moving section 61 has a protrusive section 611 as an undercut portion for molding the latch hole 221 of the mount rib 22. At the stationary section 60, the protrusive sections 611 are positioned at an elongated hole sections 601 provided in pair between the stationary section 60 and the first moving section 61, respectively, in order to mold the mount rib 12. The stationary section 60 has a rising top face 602 for forming the back face 210 at the outside of the mount rib 12.

Then, the latch side face 222 of the mount rib 22, the opposite side face 223 and tip end 225, the latch hole 221, and the back face 210 positioned between the mount ribs 12 in resin molded article 2 are molded by the protrusive section 611, an elongated hole section 601, and the top face 612 of the first moving section 61. In addition, the back face 210 at the outside of the mount rib 12 is molded by the rising top face 602.

Upon molding of the resin molded article 2, first, a cavity for molding a main body 21 of the resin molded article 2 and a pair of mount ribs 22 is formed by the lower die 6 and the upper die 7.

Next, a resin material in a softened state is ejected to the cavity, and is solidified, thereby molding resin molded articles 2 at which a pair of mount ribs 22 is provided in plurality spots.

Next, the upper die 7 is released from the lower die 6, and a space in which the first moving section 61, second moving section 62, and resin molded article 2 can rise is formed above the lower die 6.

Next, as shown in FIG. 5B, the first moving section 61 and second moving section 62 are raised. At this time, the resin molded article 2 is raised to be released from a stationary section 60 of the lower die 6, and the latch side face 222 of the pair of mount ribs 22 molded by the stationary section 60 of the lower die 6 is released. Then, a space 63 is formed at the outside of the latch side face 222 of the pair of mount ribs 22. Reference numeral 615 denotes a transmission bar for transmitting a upward lifting force of a cylinder (not shown) to the first moving section 61. In addition, the second moving section 62 is lifted by means the cylinder via another transmission bar similarly.

Next, as shown in FIG. 6A, the second moving section 62 is raised further upwardly than the first moving section 61. At this time, the molded mount rib 22 is elastically deformed in a direction of the space 63 by the protrusive section 611 for molding the latch hole 221 of the mount rib 22 of the first moving section 61 (refer to FIG. 6B), and the latch hole 221 of the molded mount rib 22 is released from the protrusive section 611 of the first moving section 61. Then, the mount rib 22 is moved from the first moving section 61 by rising the second moving section 62, whereby the resin molded article 2 is removed from the first moving section 61.

Figure 7:
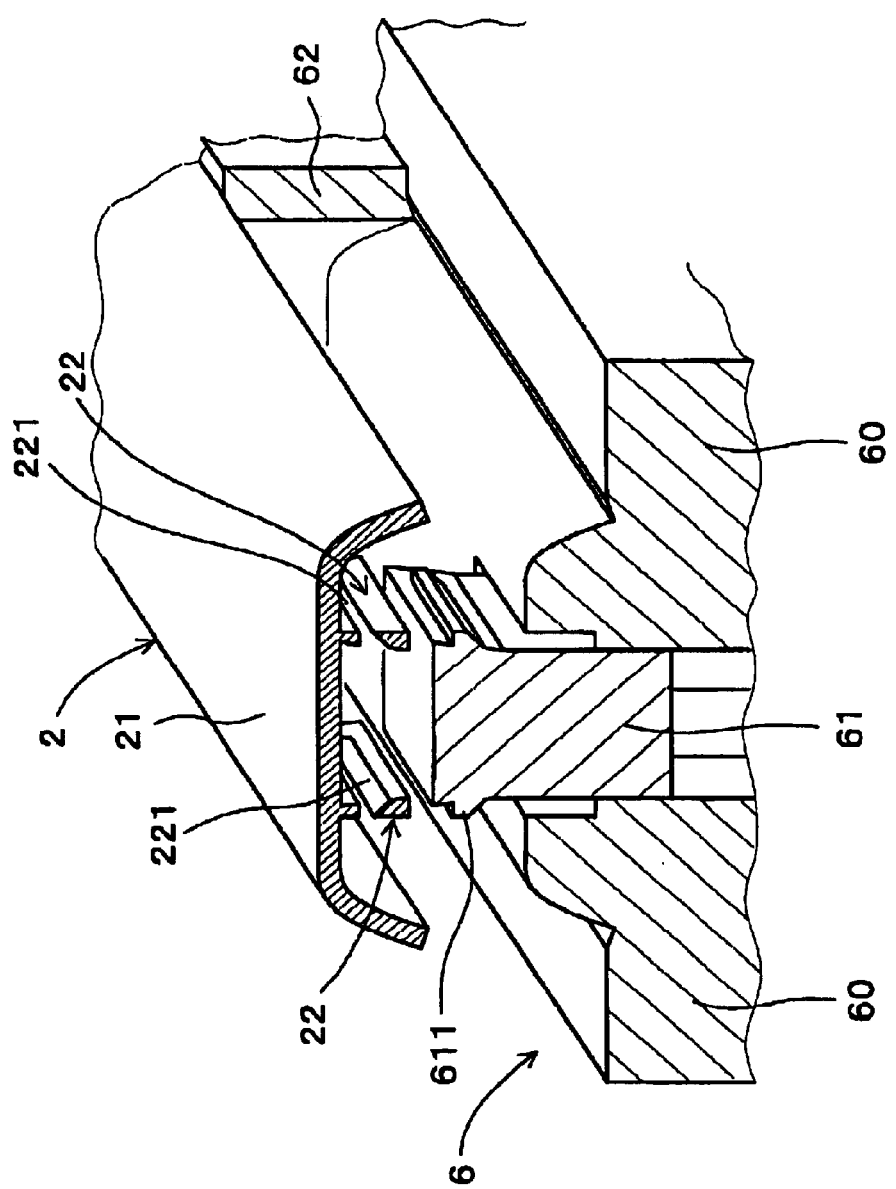
FIG. 7 is a perspective cross section showing a lower die in which the first moving section and the second moving section are raised in Embodiment 1.

As shown in FIG. 7, the lower die 6 is made of the stationary section 60 that is a base of the lower die 6, the first moving section 61, and the second moving section 62. The first moving section 61 is provided at the inside of a portion molding a pair of mount ribs 22 at the lower die 6.

Figure 8:
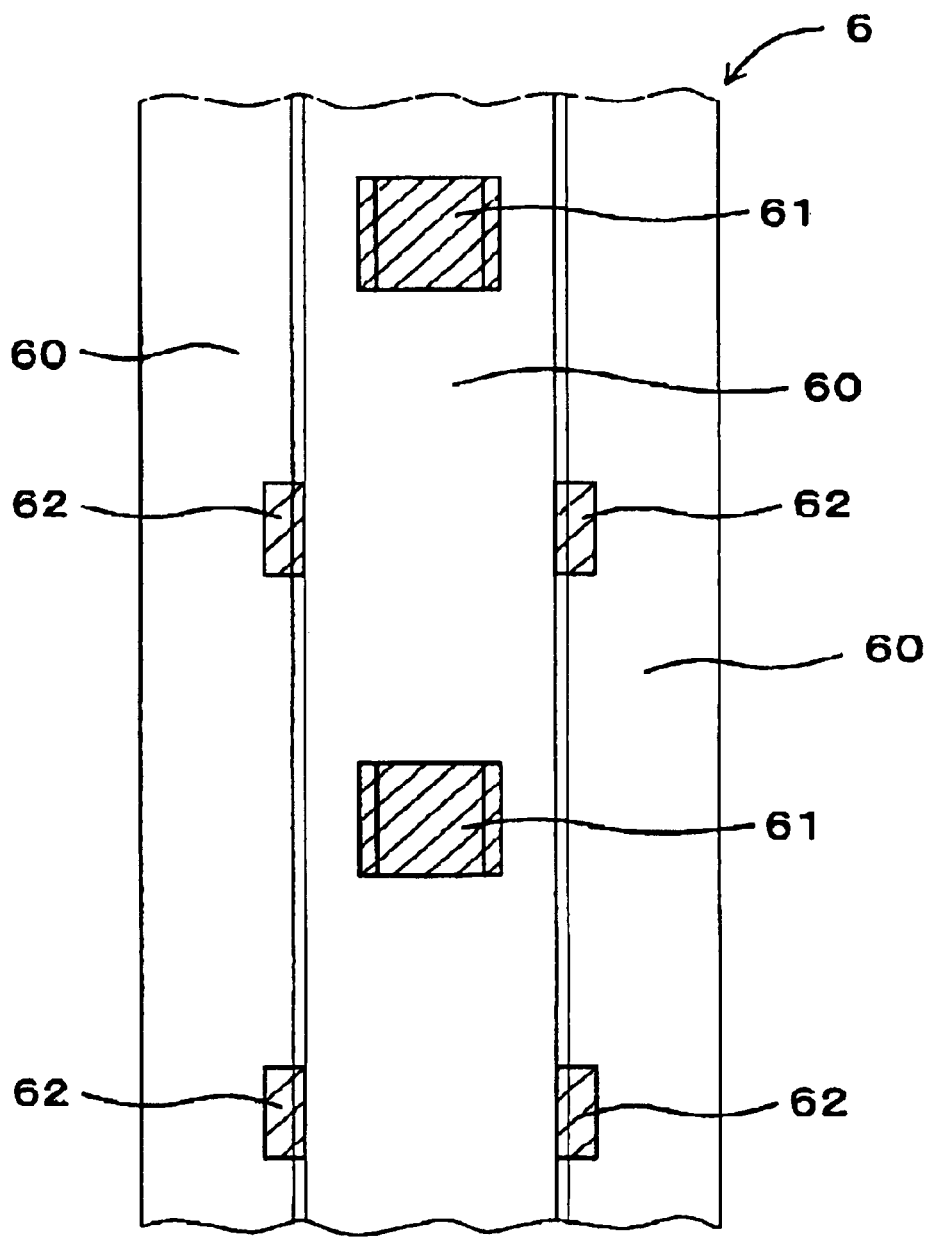
FIG. 8 is a plan view showing disposition of the first moving section and second moving section at a lower die in Embodiment 1.

As shown in FIG. 8, a plurality of pairs of the second moving section 62 is provided at the stationary 60.

In the present embodiment, the second moving section 62 is provided at a site where the first moving section 61 is not provided in the longitudinal direction of the lower die 6, on the other hand, the second moving section 62 may be provided at a site where the first moving section 61 is provided.

In the lower die 6, a portion that comes into contact with the latch side face 222 of the mount rib 22 is lowered instead of rising the first moving section 61, whereby the space 63 may be formed.

The protrusion 111 is provided at the tip end of the inner lug 12 so that the latch face 224 may be latched from the inside of the pair of mount ribs 22. In this case, instead of rising the first moving section 61, the protrusive section 611 is provided at a portion of the lower die 6 that comes into contact with both of the outsides of the mount rib 22, and a portion of this lower die 6 is raised, thereby forming the space 63.

Now, an advantageous effect of the present embodiment will be described here.

In the present embodiment, the outer lug 11 and the inner lug 12 and the mount rib 22 are provided to be erected in a direction in which the clip 1 and the resin molded article 2 face to each other.

Thus, in molding the resin molded article 2, the conventional molding die using a side core may not be used for the purpose of molding the mount rib 22.

Namely, a protrusive section 611 for molding the latch hole 221 is provided at the moving section 61 of the lower die 6. Then, in order to remove the protrusive section 611 from the latch hole 221 after molded, there is used a molding die 5 with a forcible removal structure for lifting the resin molded article 2 by the second moving section 62, and elastically deforming the mount rib 22, thereby removing the article. Therefore, the structure of the molding die 5 is simple, and the resin molded article 2 can be easily manufactured.

Upon molding of the resin molded article 2, movement of the molding die 5 is limited to movement in a direction opposite to the back face 210 of the resin molded article 2, whereby the back face 210 of the resin molded article 2 will not slide in a transverse direction. Thus, unlike a conventional example, a slide core provided at a molding die does not slide on the back face 210 of the resin molded article 2 such as side braid, thus a sink mark does not occur on the design surface of the resin molded article 2. Therefore, the resin molded article 2 having its excellent design surface can be manufactured.

The clip 1 pinches the mount rib 22 by means of the outer lug 11 and the inner filler 12, and latches the protrusion 111 at the latch hole 221 to be mounted to the resin molded article 2. Thus, when the clip 1 is mounted on the resin molded article 2, the protrusion 111 is latched at the latch face 224 of the latch hole 221, whereby the clip 1 cannot be removed easily from the resin molded article 2. Therefore, a mounting structure of the clip 1 in the present embodiment has a high mount strength.

As described above, in the mount ribs 22, the latch face 224 of the latch hole 221 is inclined toward the latch side face 222 facing the protrusion 111 so that the hole becomes smaller.

Therefore, when the resin mounting article 2 is removed from the molding die 5, the latch face 224 easily slips over the inclined face of the protrusive section 611 of the first moving section 61 facing the latch face 224, whereby the mount rib 22 is elastically deformed to be forcible-removed easily. In addition, an angle between the latch face 224 and the latch side face 222 becomes acute, a tip end portion of these faces is engaged with a corner of the protrusion 111, and the protrusion 111 can be easily latched on the latch face 224.

Embodiment 2

Figure 9:
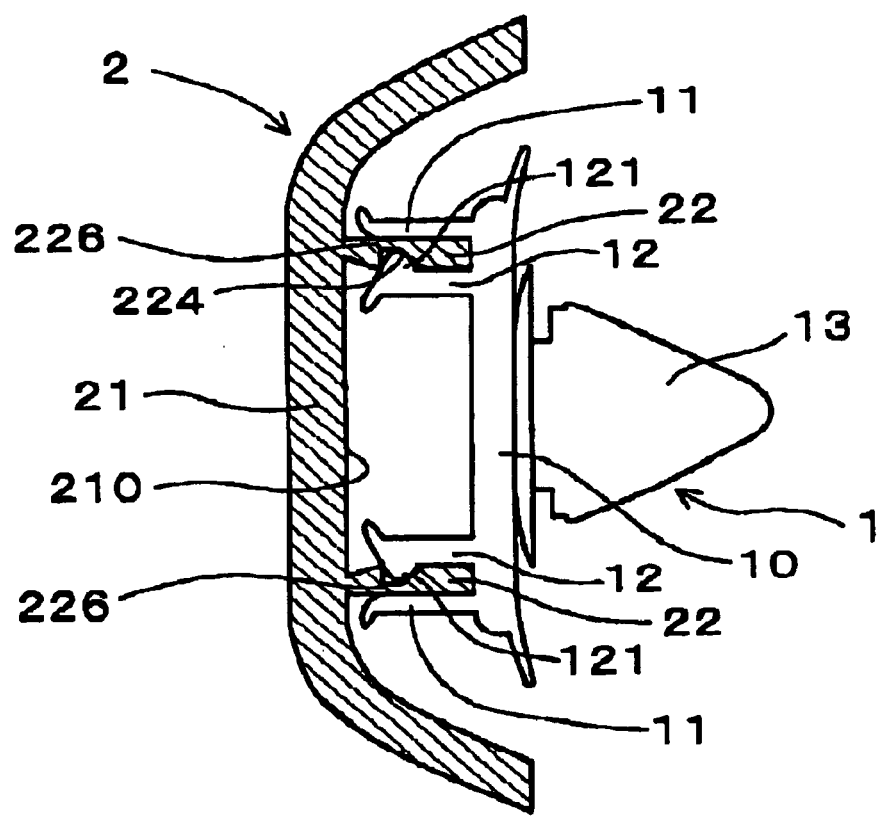
FIG. 9 is an illustrative view illustrating a mounting structure in which a clip having a protrusion at an inner lug is mounted to a resin molded article having a latch face at a groove in Embodiment 2.

In the present embodiment, as shown in FIG. 9, the latch face 224 is provided at a groove 226. The inner lug 12 has a protrusion 121. The other elements are similar to Embodiment 1.

In the present embodiment, advantageous effect similar to that according to Embodiment 1 can be achieved.

Embodiment 3

A mounting structure and manufacturing method of a resin molded article according to the illustrative embodiment of the present invention will be described with reference to FIG. 10 to FIG. 20.

Reference numerals assigned in the drawings used for illustration of the present embodiment and subsequent embodiments do not have any association with those used for the above described first to embodiment 3s.

In the present embodiment, the resin molded article is a side braid mounted to a body panel such as automobile door.

Figure 10:
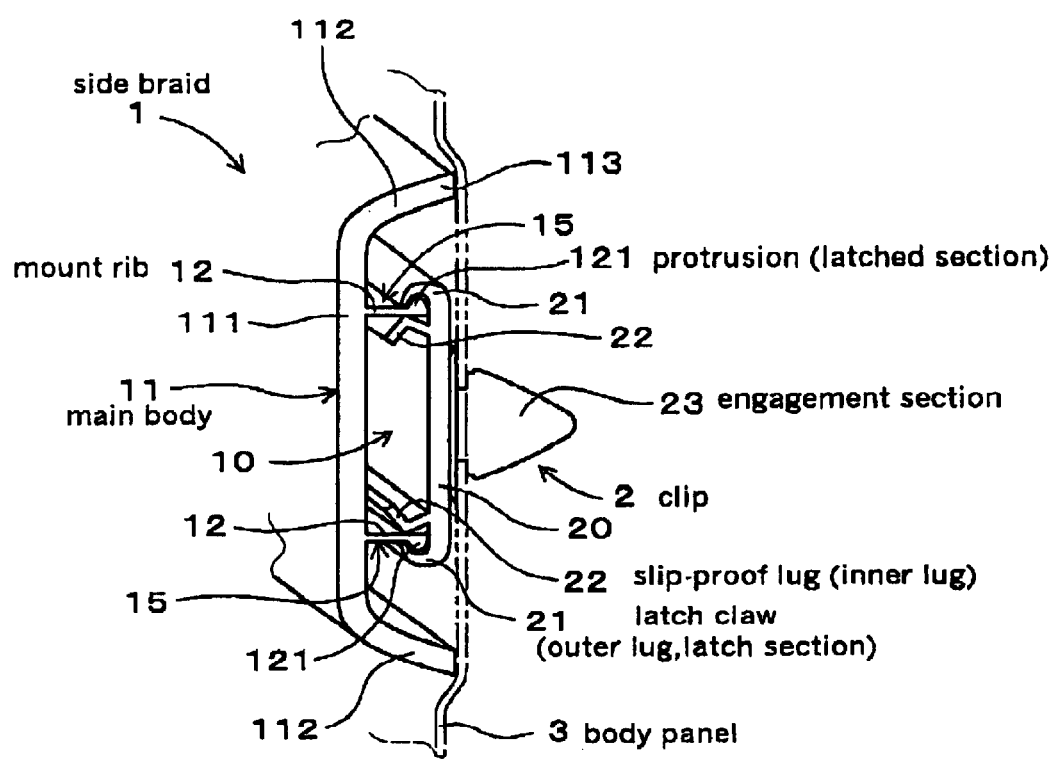
FIG. 10 is an illustrative view illustrating a mounting structure of a side braid in Embodiment 3.

As shown in FIG. 10, a side braid 1 in the present embodiment has an elongated main body 11 and a plurality of clip mounting sections 10 formed intermittently along the longitudinal direction, and each clip mounting section 10 is composed of a pair of mount ribs 12 facing to each other. In addition, at the tip end of the mount rib 12, a protrusion 121 is provided as a latched section protruded outwardly on the outside faces 15 that do not facing to each other.

The clip 2 has a latch claw 21 that is a latch section provided at an outer lug to be latched at the protrusion 121 of the mount rib 12, and a slip-proof lug 22 that is an inner lug provided opposite to the latch claw 21 so as not to remove latch of the latch claw 21 to the protrusion 121. In addition, the clip 2 has an engagement section 23 engaged with a body panel 3 at a side facing the body panel 3 (refer to FIG. 11A and FIG. 11B).

In the clip 2, the latch claw 21 is latched at the protrusion 121 of the mount rib 12, and is mounted to the side braid 1. In addition, the side braid 1 is mounted to the body panel 3 by means of an engagement section 23 of the clip 2 mounted to the mount rib 12.

A detailed description will be given below.

Figure 11A:
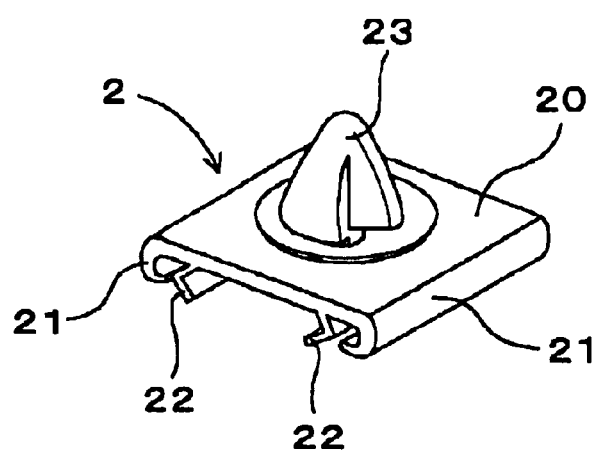
FIG. 11A is a perspective view showing a side of a clip facing to a body panel in Embodiment 3.
Figure 11B:
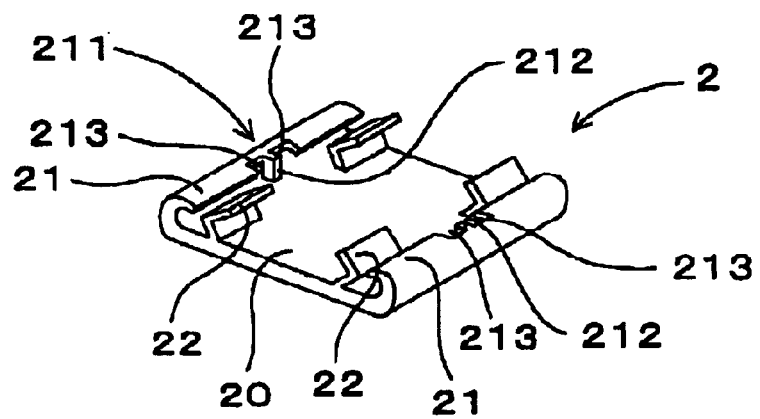
FIG. 11B is a perspective view showing a side of a clip facing to a side braid in Embodiment 3.

As shown in FIG. 11A and FIG. 11B, the clip 2 has a position-fixing section 211 for fixing a position of the clip 2, in the latch claw 21, in the longitudinal direction of the side braid 1. This position-fixing section 211 has an erected section 212 at the center portion of the latch claw 21 and cutouts 213 at both ends of the erected section 212, and the erected section 212 is erected from the base section 20 of the clip 2.

The slip-proof lug 22 of the clip 2 is formed in V-shaped, and a protruded side of the V shape is formed to face the latch claw 21. In this manner, when the side braid 1 and clip 2 are assembled each other, the mount rib 12 of the side braid 1 is guided to the slip-proof lug 22 so as to be latched easily by the latch claw 21.

Figure 12A:
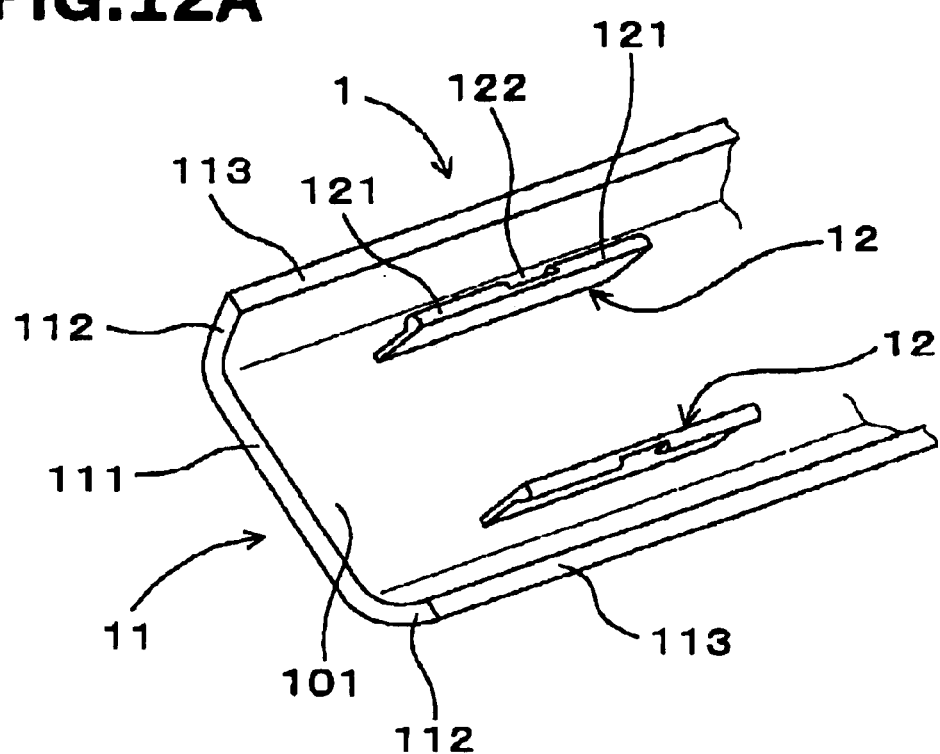
FIG. 12A is a perspective view showing a back side face of the side braid in Embodiment 3.

As shown in FIG. 12A, the main body 11 of the side braid 1 is formed in a U shape having a pair of a bent section 112 bent toward the back side face 101 at both sides of the base section 111. The mount rib 12 is formed to be erected from the back side face 101, and is formed to be shorter than the bent section 112. Thus, when the side braid 1 and clip 2 are assembled each other, the surface of the base section 20 of the clip 2 and the tip end 113 of the bent section 112 of the side braid 1 abut against the body panel 3 (refer to FIG. 10).

At the mount rib 12 of the side braid 1, a recess 122 cutting out the protrusion 121 is provided at a position that corresponds to the erected section 212 of the position-fixing section 211 of the clip 2. When the clip 2 and side braid 1 are assembled each other, the erected section 212 of the clip 2 is engaged into the recess 121, and the clip 2 is positioned in the longitudinal direction of the side braid 1.

Figure 12B:
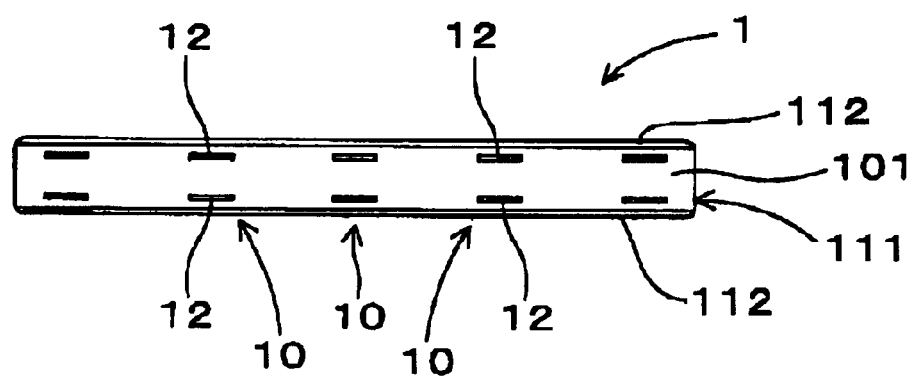
FIG. 12B is a plan view showing disposition of a mount rib on the back side face of a side braid in Embodiment 3.

As shown in FIG. 12B, a plurality of clip mounting sections 10 formed intermittently along the longitudinal direction is provided at the back side face of the side braid 1. These plurality of clip mounting sections 10 are composed of a pair of mount ribs 12 facing to each other.

Figure 13:
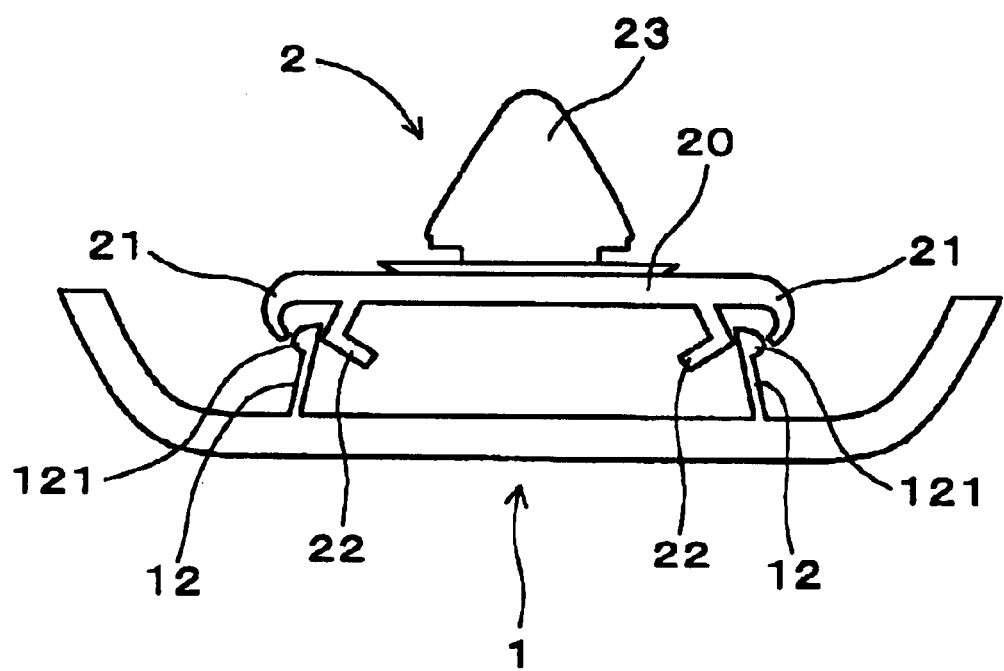
FIG. 13 is an illustrative view illustrating a state in which a clip is mounted to the side braid in Embodiment 3.

As shown in FIG. 13, when the side braid 1 and clip 2 are assembled each other, the mount rib 12 of the side braid 1 is elastically-deformed inwardly by means of the latch claw 21 so that the clip 2 is mounted to the side braid 1. At this time, the slip-proof lug 22 of the clip 2 is elastically deformed in the inward direction as well, and is restored to its original position after the latch claw 21 has been latched at the protrusion 121.

Now, a manufacturing method of the side braid will be described here.

Figure 14A:
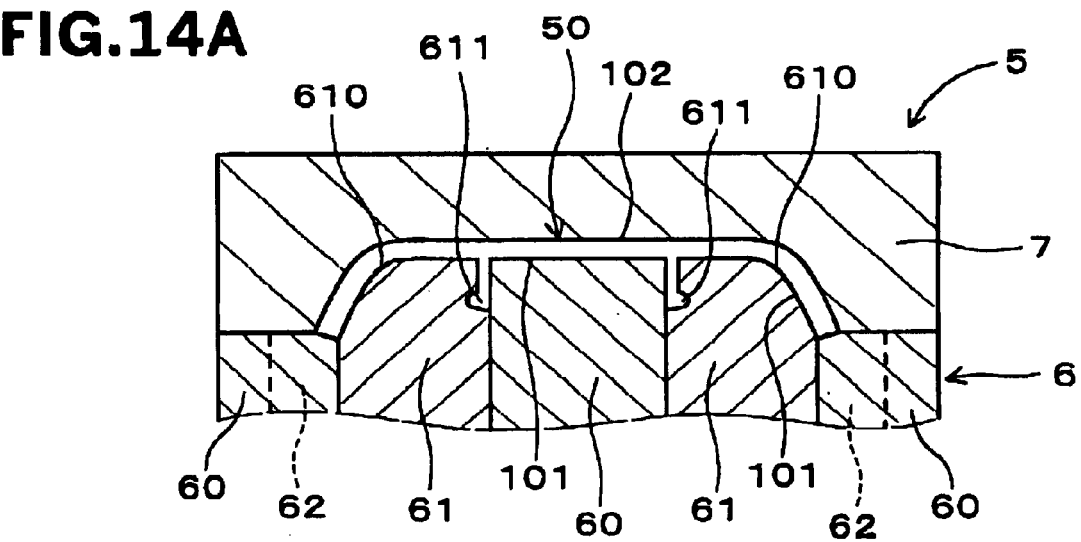
FIG. 14A is an illustrative view illustrating a state in which injection-molding is carried out in a molding die of the side braid in Embodiment 3.

As shown in FIG. 14A, in molding of the side braid 1, there are used a molding die 5 having a lower die 6 that corresponds to the shape of the back side face 101 having the mount rib 12 provided thereat and an upper die 7 that corresponds to the shape of the top side face 102 of the side braid 1.

The lower die 6 has a stationary section 60, a first moving section 61 movable relatively to the stationary section 60 in the direction of the upper die 7, and a second moving section 62 movable to be further distant than the movement of the first moving section 61 in the direction of the upper die 7. In addition, the first moving section 61 has a molding face 610 having provided thereat an undercut portion 611 for molding the outside face 15 of the mount rib 12 and forming the protrusion 121.

Upon molding of the side braid 1, first, a cavity 50 for molding the main body 11 and a pair of mount ribs 12 at the clip mounting section 10 is formed by the lower die 6 and the upper die 7. In addition, the molding section of each clip mounting section 10 in the cavity 50 is constructed by being surrounded by a face for molding the outside face 15 of the mount rib 12 at the first moving section 61 and a face positioned relevant to the first moving section 61, the face molding the inside face 16 of the mount rib 12 at the stationary section 60 of the lower die 6.

Next, the cavity 50 is subjected to injection-molding, thereby molding the side braid 1 in which clip mounting sections 10 each consisting of a plurality of pairs of mount ribs 12 are mounted.

Next, the upper die 7 is released from the lower die 6, thereby forming a space in which the first moving section 61 and the second moving sections 62 and the side braid 1 can rise upward of the lower die 6.

Figure 14B:
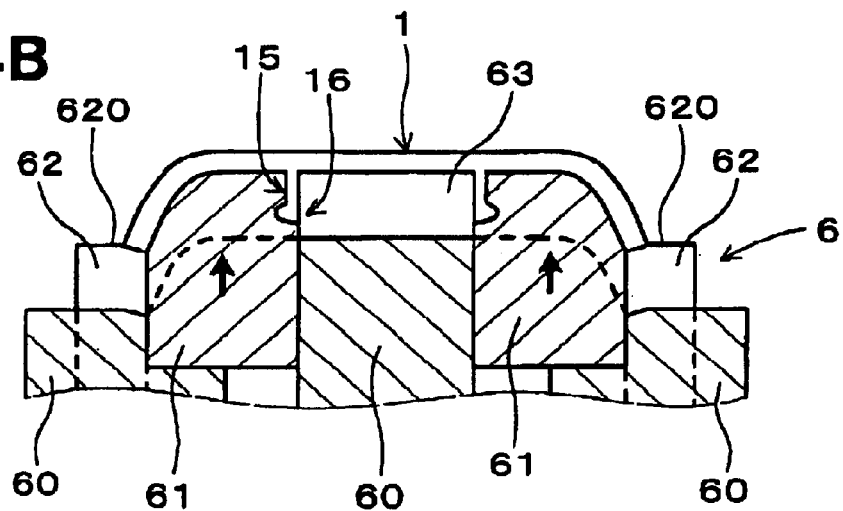
FIG. 14B is an illustrative view illustrating a state in which the first moving section and second section are raised in a molding die of the side braid in Embodiment 3.

Next, as shown in FIG. 14B, the first moving section 61 and the second moving section 62 are raised. At this time, the side braid 1 is raised to be released from the stationary section 60 of the lower die 6, and a face for molding the inside face 16 of the mount rib 12 is released from the inside face 16 of a pair of the molded mount ribs 12. Then, a space 63 is formed between the inside faces 16 of the pair of the mount ribs 12.

Figure 15A:
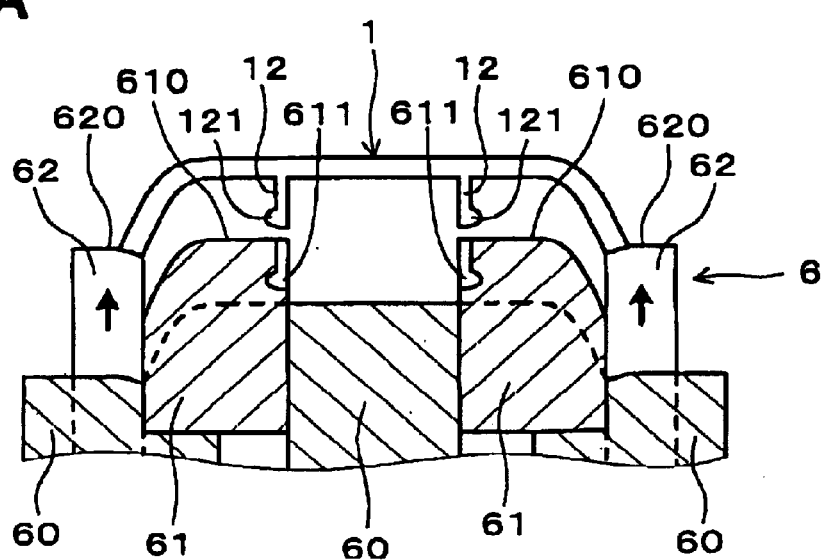
FIG. 15A is an illustrative view illustrating a state in which the second moving section is further raised in a molding die of the side braid in Embodiment 3.
Figure 15B:
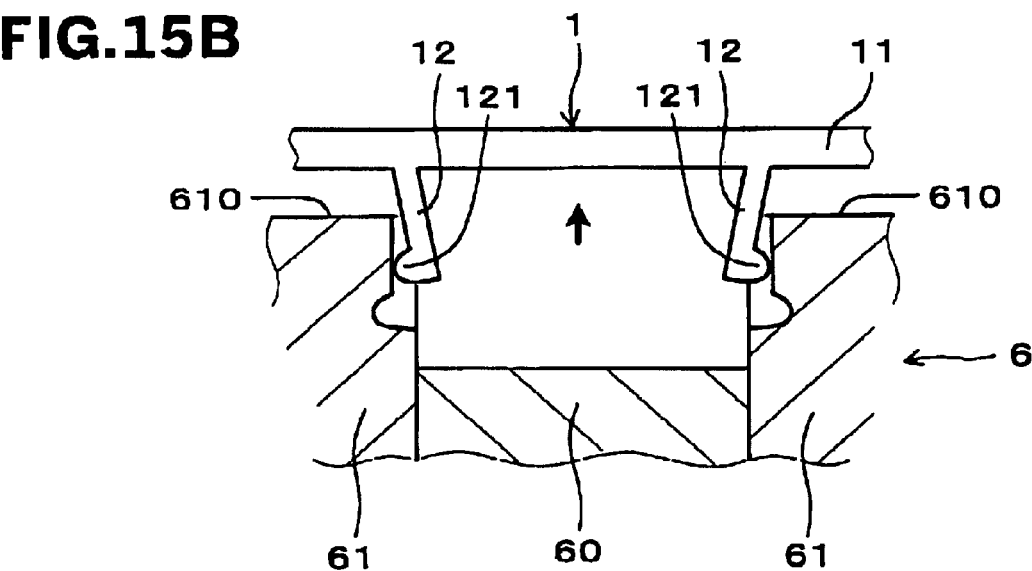
FIG. 15B is an illustrative view illustrating a state in which a protrusion is removed from an undercut portion while a mount rib is elastically deformed in a direction of a space in a molding die of the side braid in Embodiment 3.

Next, as shown in FIG. 15A, the second moving section 62 is raised to be further upward than the first moving section 61. At this time, the molded mount rib 12 is elastically deformed in the direction of the space 63 by a face for molding the outside face 15 of the mount rib 12 of the first moving sections 61 (refer to FIG. 15B), and the protrusion 121 of the molded mount rib 12 is removed from the undercut portion 611 of the first moving section 61. Then, the mount rib 12 is moved from between the first moving sections 61 by the rise of the second moving section 62, and the side braid 1 is removed from the first moving section 61.

Figure 16:
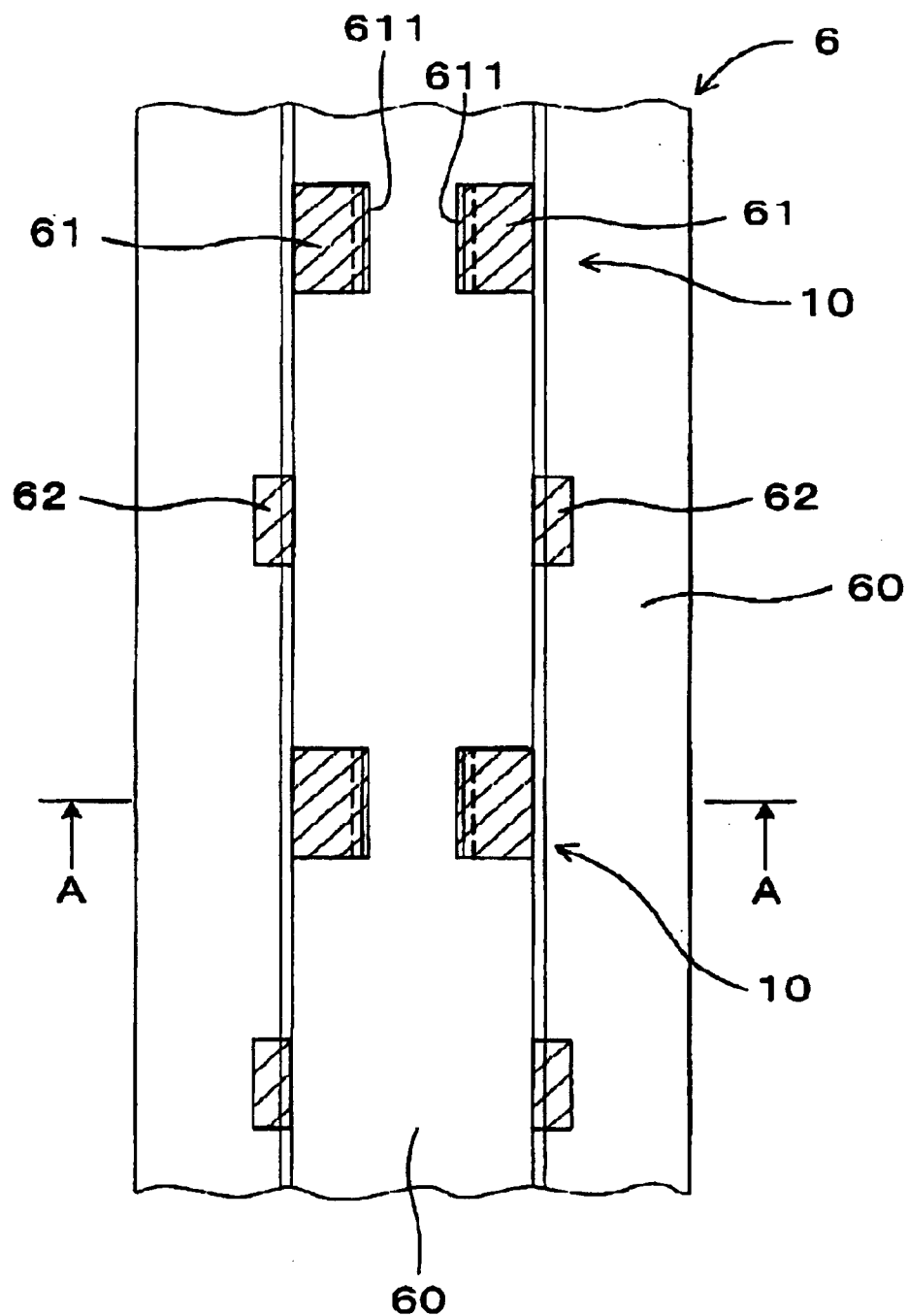
FIG. 16 is a plan view showing disposition of the first moving section and the second moving section to a molding die in Embodiment 3.

As shown in FIG. 16, the lower die 6 is made of the stationary section 60 that is a base of the lower die 6, the first moving section 61, and the second moving section 62. The first moving sections 61 are provided in pairs at sites for forming the outside face 15 of the mount rib 12 at the clip mounting section 10 at the lower die 6.

Figure 17:
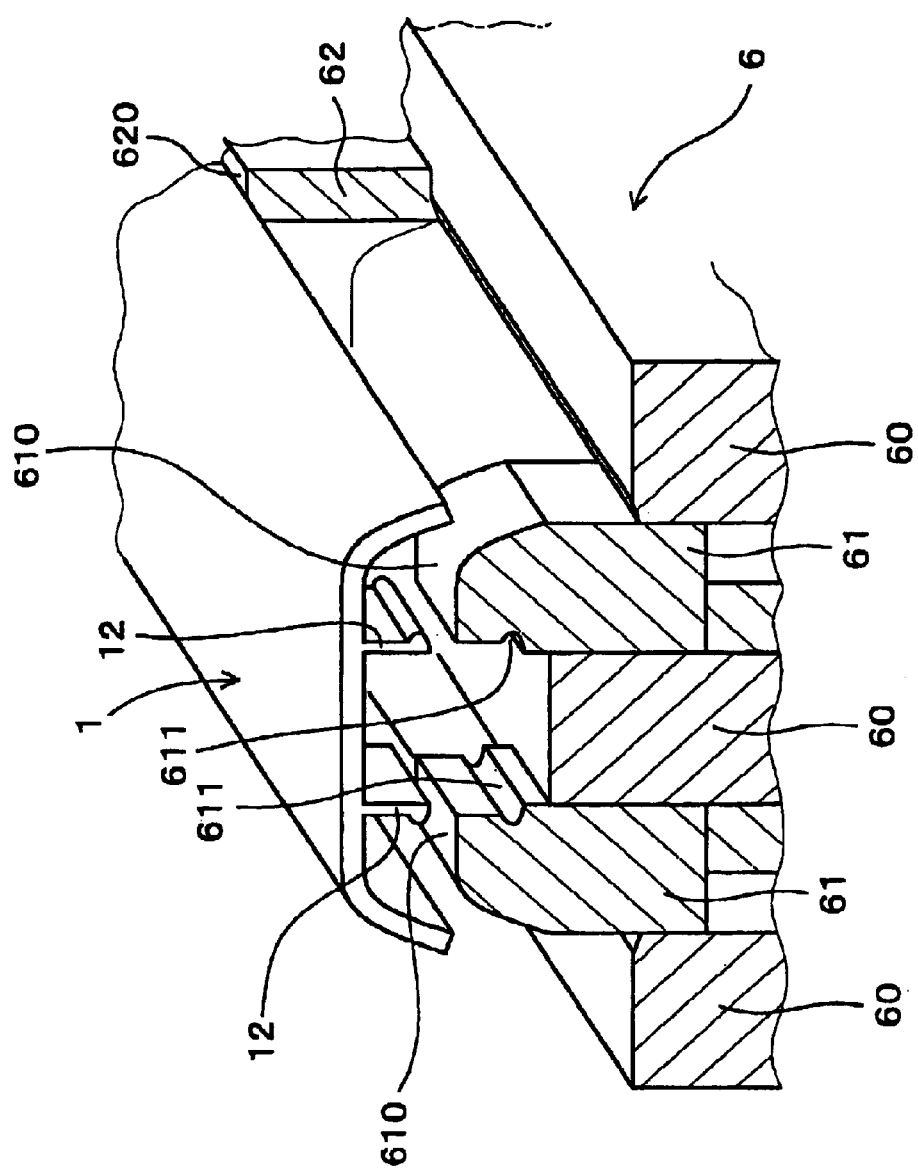
FIG. 17 is a perspective cross section taken by line A—A of FIG. 16 showing a state in which the first moving section and the second moving section are raised in Embodiment 3.

As shown in FIG. 17, a molding face 610 of the first moving section 61 is formed to correspond to the shape of the back side face 101 of the side braid 1. A tip end face 620 of the second moving section 62 is formed to correspond to the shape of the tip end 113 of the bent section 112.

The second moving sections 62 are provided in pairs in several positions at the stationary section 60.

Now, a molding apparatus 4 for molding the side braid 1 will he described below.

Figure 18:
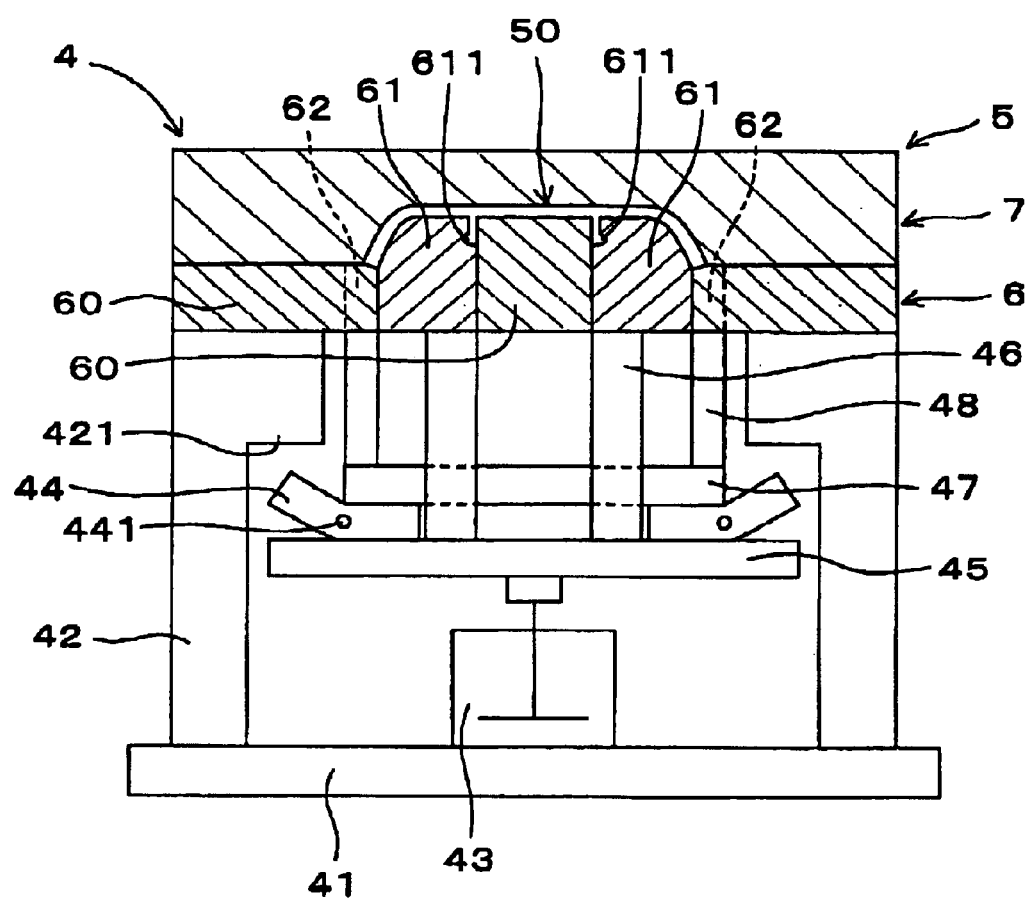
FIG. 18 is an illustrative view showing a molding apparatus in Embodiment 3.

As shown in FIG. 18, the molding apparatus 4 has a base plate 41, a column 42, a hydraulic cylinder 43, a cam 44, a first plate 45, a first transmission bar 46, a second plate 47, and a second transmission bar 48.

The hydraulic cylinder 43 is provided for moving the first moving section 61 and the second moving section 62.

The molding apparatus 4 generates a series of upward stroke operations, i.e., two-step movement of a upward movement of the first moving section 61 and a upward movement of the second moving section 62 by means of the cam 44.

A first plate 45 is provided above the hydraulic cylinder 43, and the cam 44 is disposed rotatably around a rotary shaft 441 on the first plate 45. This cam 44 has a first bar 442 and a second bar 443 provided around the rotary shaft 441. The first bar 442 is pinched between a first plate 45 and a second plate 47. When the hydraulic cylinder 43 is raised, the second plate 47 is raised. A tip end corner of the second bar 443 abuts against a stopper section 421 of the column 42 so that the first bar 442 is moved by rotation of the rotary shaft 441.

The first transmission bar 46 is provided on the first plate 45, and the first moving section 61 is placed on the first transmission bar 46. Then, the first moving section 61 enables upward movement by means of the hydraulic cylinder 43 via the first plate 45 and the first transmission bar 46.

The second plate 47 is provided upwardly of the first plate 45 with the cam 44 interposed therebetween. The second transmission bar 48 is provided on the second plate 47, and the second moving section 62 is placed on the second transmission bar 48. Then, the second moving section 62 enables upward movement by means of the hydraulic cylinder 43 via the first plate 45, cam 44, second plate 47, and second transmission bar 48.

Upon molding of the side braid 1, first, injection-molding is carried out by the lower die 6 and the upper die 7. Then, the upper die 7 is released from the lower die 6.

Figure 19:
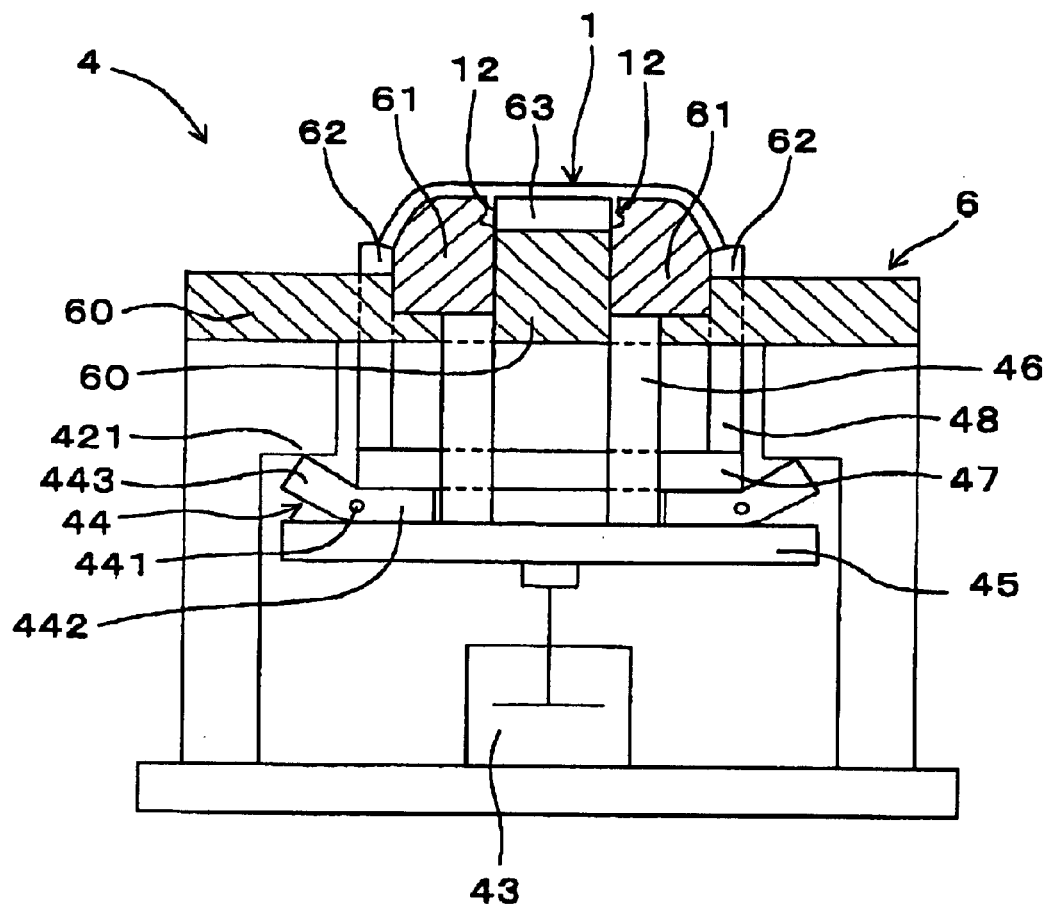
FIG. 19 is a view showing the molding apparatus, in which the first moving section and the second moving section are raised after an upper die has been released in Embodiment 3.

Next, as shown in FIG. 19, when the hydraulic cylinder 43 is raised, the first plate 45 is lifted, and the first moving section 61 is raised. At the same time, the second plate 47 is lifted via the first bar 442 of the cam 44, the second moving section 62 is raised, and the side braid 1 is lifted.

At this time, a space 63 is formed between the mount ribs 12 of the side braid 1 by rising of the first moving section 61. At this time, a portion at which the mount ribs 12 are not provided at the back side face 101 of the side braid 1 is removed from the stationary section 60 of the lower die 6.

This rising of the first moving section 61 and the second moving section 62 is carried out until the tip end corner of the second bar 443 of the cam 44 abuts against the stopper section 421 provided at the column 42.

Figure 20:
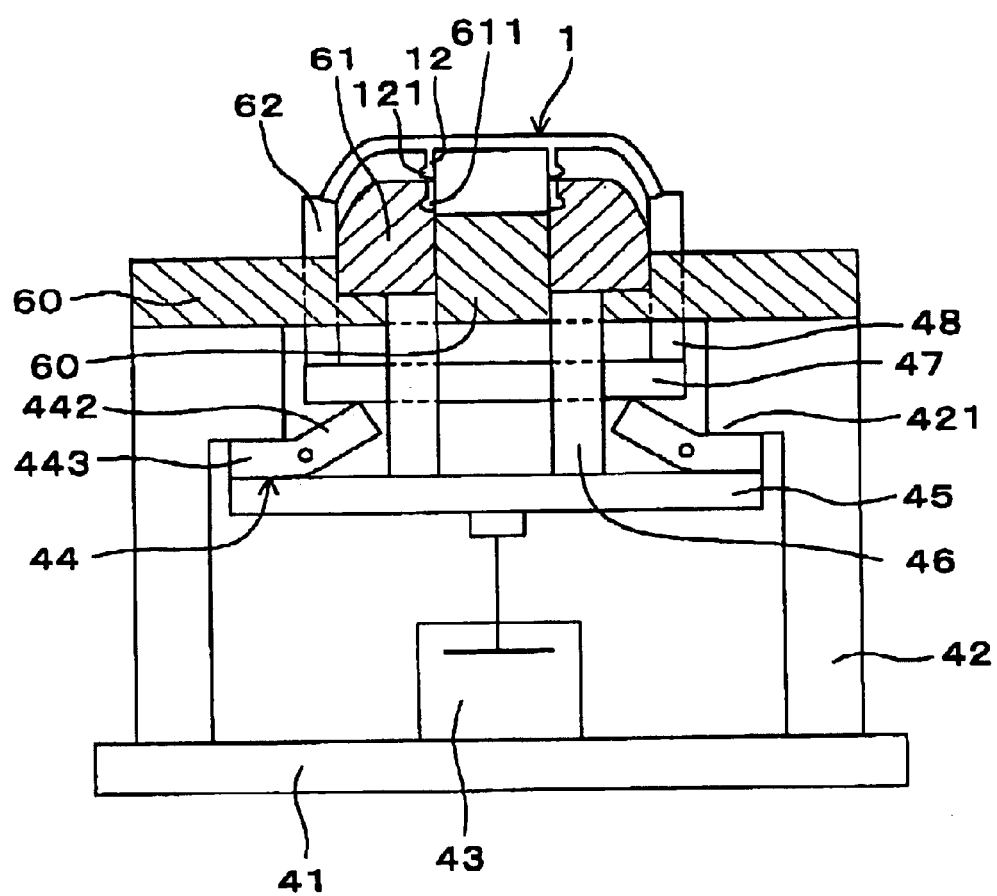
FIG. 20 is a view showing the molding apparatus, in which the second moving section is further raised in Embodiment 3.

Next, as shown in FIG. 20, by the rising of the hydraulic cylinder 43, when the tip end corner of the second bar 443 of the cam 44 abuts against the stopper section 421 provided at the column 42, the cam 44 rotates around the rotary shaft 441, and the first bar 442 provided at an opposite side of the second bar 443 lifts the second plate 47. Then, the second moving section 62 is raised, and the side braid 1 is lifted. At this time, the protrusion 121 of the mount rib 12 of the side braid 1 slips off from the undercut portion 611 of the first moving section 61.

The rising of the second moving section 62 terminates when the side of the second bar 443 abuts against the first plate 45, and thus, molding of the side braid 1 completes.

In the present embodiment, the second moving section 62 is provided at a site where the first moving section 61 is not provided in the longitudinal direction of the lower die 6. On the other hand, the second moving section 62 may be provided at a site at which the first moving section 61 is provided.

In the present embodiment, by moving the second moving section 62, the protrusion 121 is removed from the undercut portion 611 while the mount rib 12 is elastically deformed in the direction of the space 63 formed between a pair of mount ribs 12.

Namely, movement in a transverse direction of the lower die 6 is required in order to remove a portion protruded in a transverse direction such as the protrusion 121 from the lower die 6, according to the conventional manufacturing method, while the mount rib 12 of the side braid 1 that is a molding article is elastically-deformed, and the side braid 1 is removed by being raised forcibly in the present embodiment.

Thus, movement of the lower die 6 may be limited to upward movement of the first moving section 61 and the second moving section 62. Therefore, a molding apparatus 4 for molding a side braid 1 can be simple structured.

In the manufacturing method according to the present embodiment, upon molding of the side braid 1, movement of the first moving section 61 and second moving section 62 is limited to a direction opposite to the back side face 101 of the side braid 1, whereby there is no need to slide the back side face 101 of the side braid 1 in a transverse direction. Thus, unlike a conventional example, a slide core provided at the lower die 6 does not slide on the back side face 101 of the side braid 1, whereby a sink mark does not occur on the design surface of the side braid 1. Therefore, a side braid 1 having its excellent design surface can be manufactured.

It is difficult to mold the side braid 1 having the clip mounting sections 10 in several positions by means of conventional extrusion molding. In contrast, in the present embodiment, molding is carried out by injection-molding, and thus, a side braid 1 having a clip mounting section 10 can be easily molded.

In the present embodiment, the side braid 1 has clip mounting sections 10 formed in plurality intermittently. Thus, when the clip 2 is mounted to the side braid 1, its mount position can be easily fixed, and the clip 2 is easily mounted.

When the side braid 1 is mounted to the body panel 3, the clip 2 is interposed between them. The clip 2 latches the latch claw 21 at the protrusion 121 at the mount rib 12 of the side braid 1 to be mounted to the side braid 1.

In addition, a latch of the latch claw 21 to the protrusion 121 is assisted by a slip-proof lug 22 so that the latch claw 21 may not slip off the protrusion 121. Thus, when the side braid 1 is mounted to the body panel 3 by means of the engagement section 23 of the clip 2, the latch claw 21 is latched at the protrusion 121, and the side braid 1 cannot be easily removed from the clip 2. Therefore, a mounting structure of the side braid 1 is rigid, although a clip 2 and the side braid 1 are separate sections.

Embodiment 4

Figure 21A:
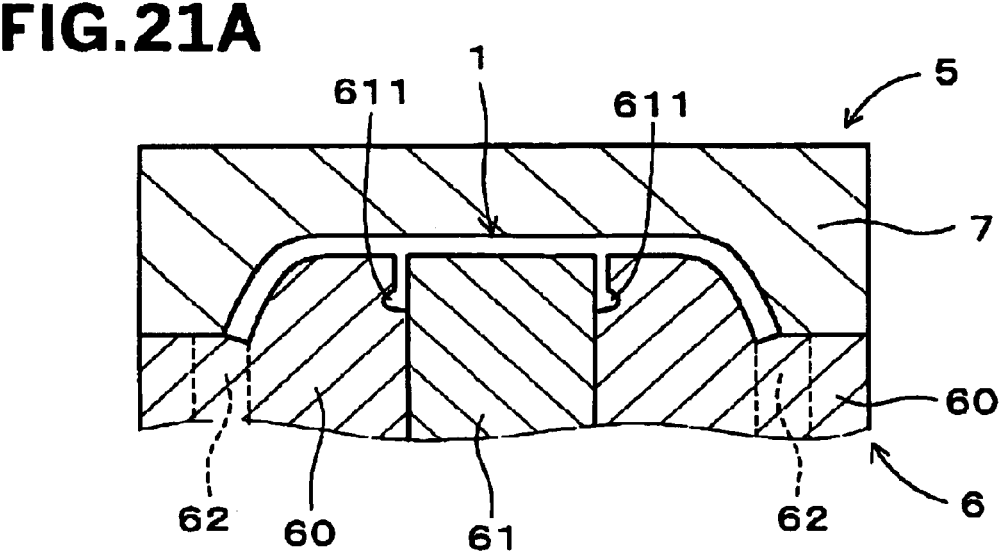
FIG. 21A is an illustrative view showing a state in which injection-molding is carried out in a molding die of the side braid in Embodiment 4.
Figure 22A:
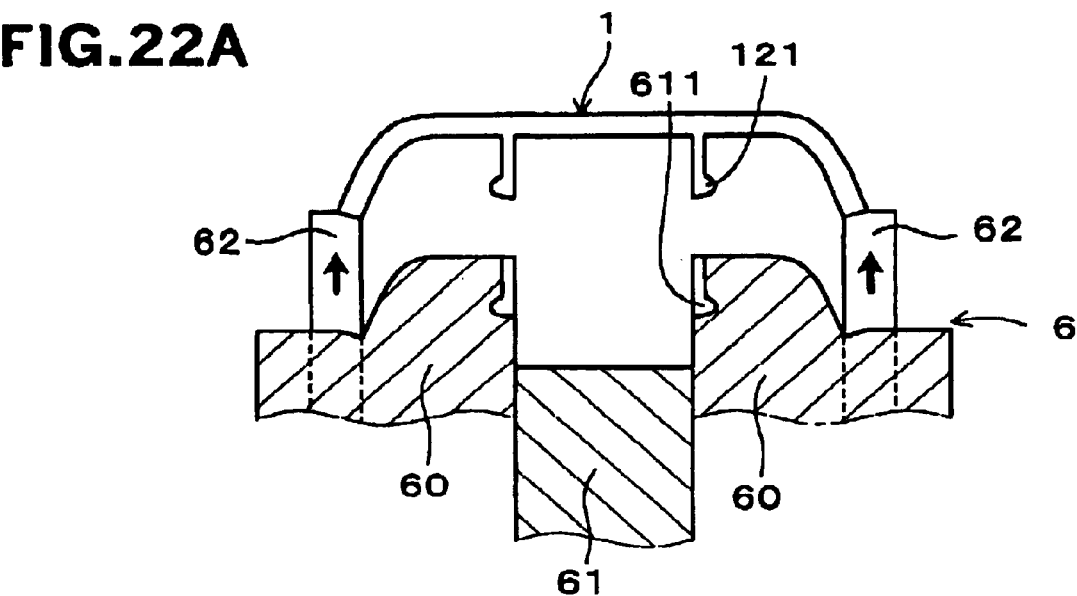
FIG. 22A is an illustrative view showing a state in which the second moving section is raised in another molding die of the side braid in Embodiment 4.
Figure 22B:
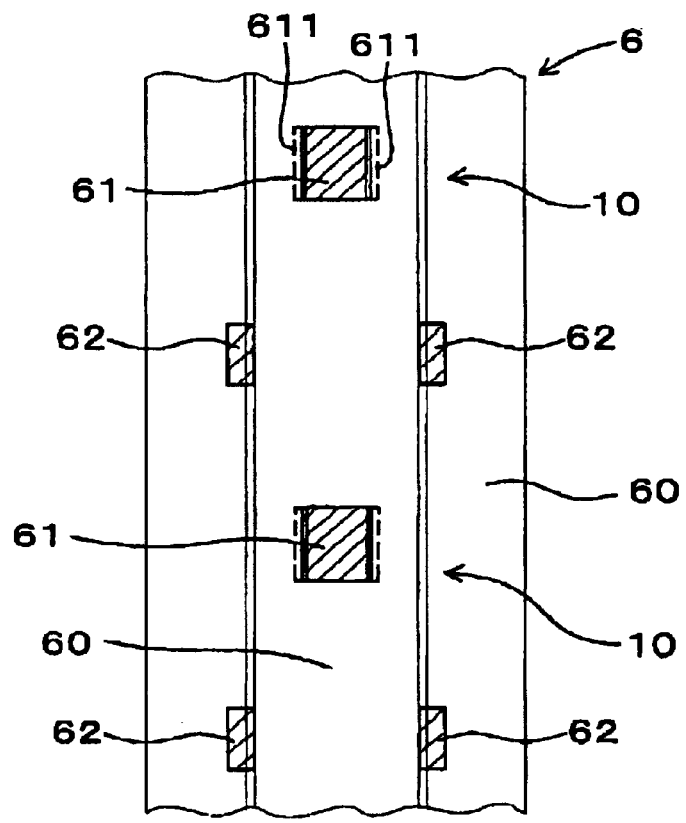
FIG. 22B is a plan view showing a disposition of the first moving section and the second moving section to a lower die in another molding die of the side braid in Embodiment 4.

As shown in FIG. 21A and FIG. 22B, in the present embodiment, the first moving section 61 is provided between portions for molding a pair of mount ribs 12 of the lower die 6. Then, the first moving section 61 is lowered relatively to the stationary section 60 of the lower die 6, thereby forming a space 63 between a pair of mount ribs 12 at the clip mounting section 10.

In addition, in the present embodiment, there are provided a cylinder for lowering the first moving section 61 and a cylinder raising the second moving section 62. The other elements are similar to those according to Embodiment 3.

Figure 21B:
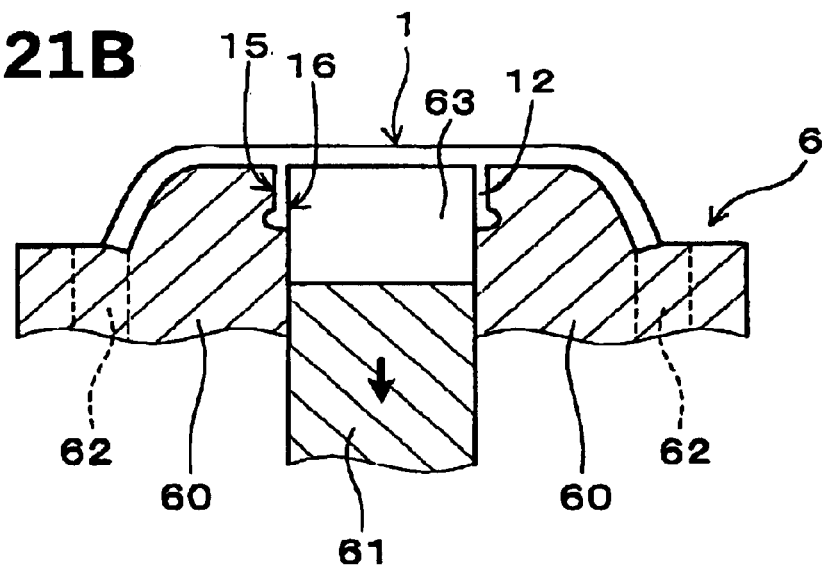
FIG. 21B is an illustrative view showing a state in which the first moving section is lowered in the molding die of the side braid in Embodiment 4.

As shown in FIG. 21B, in molding of the side braid 1, the first moving section 61 is lowered relatively to the stationary section 60. At this time, a face for molding the inside faces 16 of the mount rib 12 at the first moving section 61 is released from the inside face 16 of a pair of the molded mount ribs 12. Then, a space 63 is formed between the inside faces 16 of a pair of the mount ribs 12.

Next, as shown in FIG. 22A, the second moving section 62 rises to the fixing section 60. At this time, the mount rib 12 is elastically deformed in the direction of the space 63 by a face for molding the outside face 15 of the mount rib 12 of the stationary section 60, and the protrusion 121 of the molded mount rib 12 is removed from the undercut portion 611 of the stationary 60. Then, the mount rib 12 is moved from the stationary 60, and the side braid 1 is removed from the stationary section 60.

In the present embodiment, movement of the lower die 6 may be limited to movement in a direction opposite to the upper die 7 by the first moving section 61 and the second moving section 62. Therefore, like Embodiment 3, the molding apparatus 4 of the side braid 1 including the lower die 6 and the upper die 7 can be simplified. In addition, like Embodiment 33, the side braid 1 having its excellent design surface can be manufactured.

Otherwise, advantageous effect similar to that according to Embodiment 3 can be achieved.

Embodiment 5

Figure 23A:
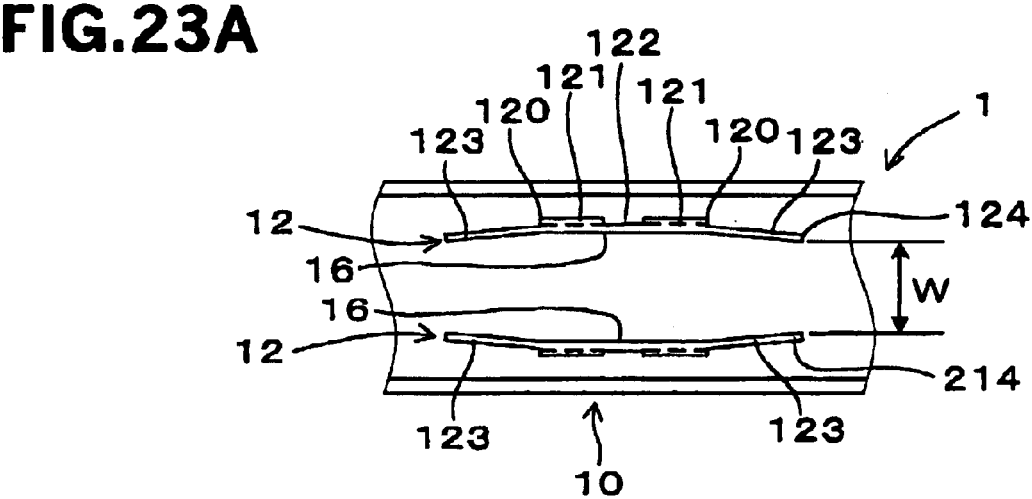
FIG. 23A is a plan view showing a back side face of the side braid in Embodiment 5.

As shown in FIG. 23A, in the present embodiment, a reinforcement rib 123 for improving the strength of the side braid 1 is provided at an end 120 in the longitudinal direction of the mount rib 12 of the side braid 1. The reinforcement ribs 123 are provided to be inclined in a longitudinal direction so that a width W between these reinforcement ribs 123 becomes smaller toward the tip end 124.

Figure 23B:
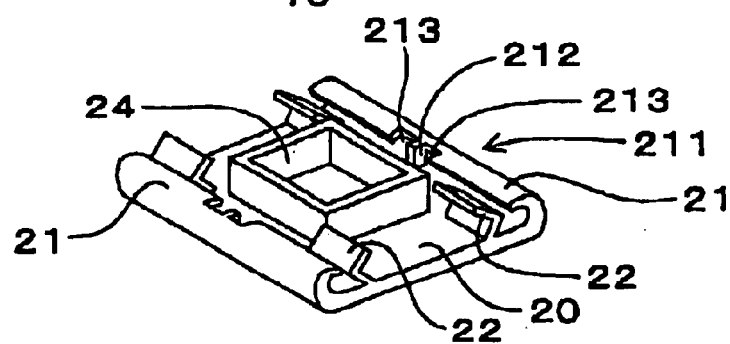
FIG. 23B is a perspective view showing a side of a clip facing to a side braid in Embodiment 5.
Figure 23C:
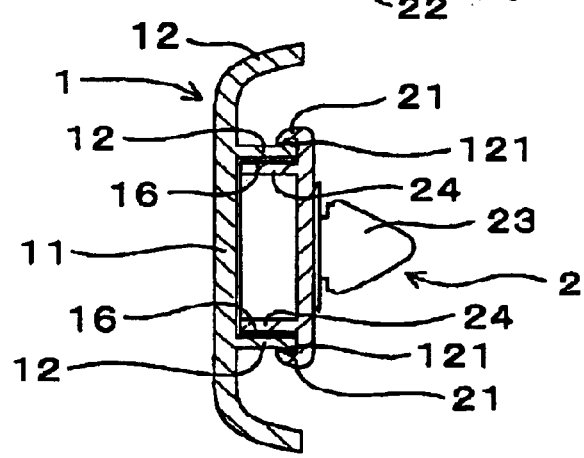
FIG. 23C is an illustrative view illustrating a mounting structure of the side braid in Embodiment 5.

As shown in FIG. 23B and FIG. 23C, the clip 2 has a reinforcement section 24 facing to the inside face 16 of the mount rib 12 at a side facing to the side braid 1. In addition, the reinforcement section 24 is provided at the center portion of the clip 2. The other elements are similar to Embodiment 3.

In the present embodiment, the side braid 1 increases its strength by the reinforcement rib 123, and is hardly deformed after being mounted to the body panel 3.

As described above, the reinforcement rib 123 is inclined in a longitudinal direction so that the width W becomes smaller toward the tip end 124. Thus, when the side braid 1 is subjected to injection-molding, a material can be supplied smoothly in the longitudinal direction of the side braid 1. Therefore, the side braid 1 is molded easily.

In addition, the strength of the clip 2 is improved by the reinforcement section 24. After the clip 2 is mounted to the side braid 1, the reinforcement section 24 abuts against the inside face 16 of the mount rib 12 of the side braid 1, and the elastic deformation of the mount rib 12 can be prevented. Thus, the mount strength between the side braid 1 and clip 2 can be improved more.

Otherwise, advantageous effect similar to that according to Embodiment 3 can be achieved.

Embodiment 6

Figure 24A:
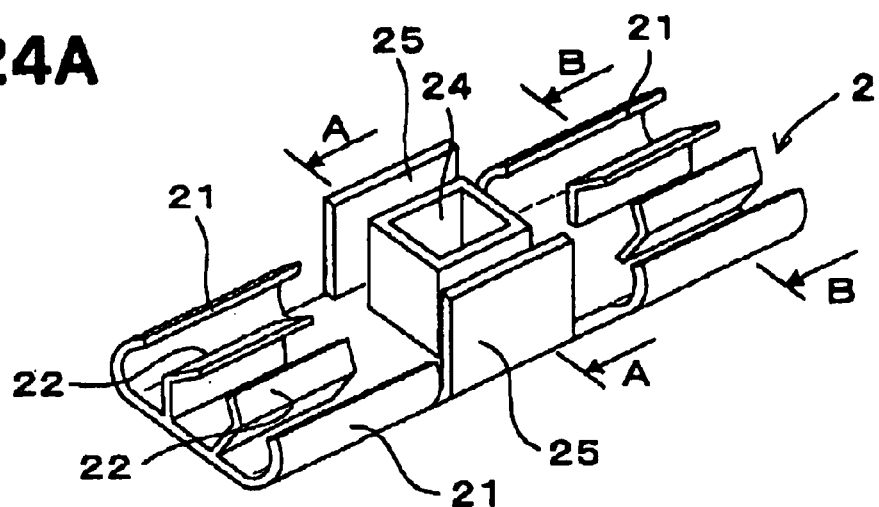
FIG. 24A is a perspective view showing a side of a clip facing to a side braid in Embodiment 6.
Figure 24B:
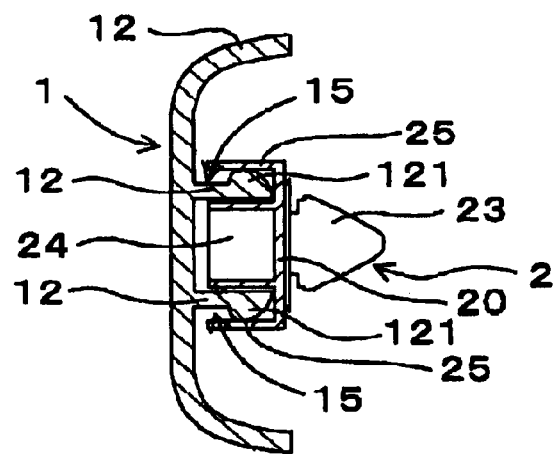
FIG. 24B is an illustrative view illustrating a mounting structure of a clip to a side braid taken along line A—A shown in FIG. 24A in Embodiment 6.
Figure 24C:
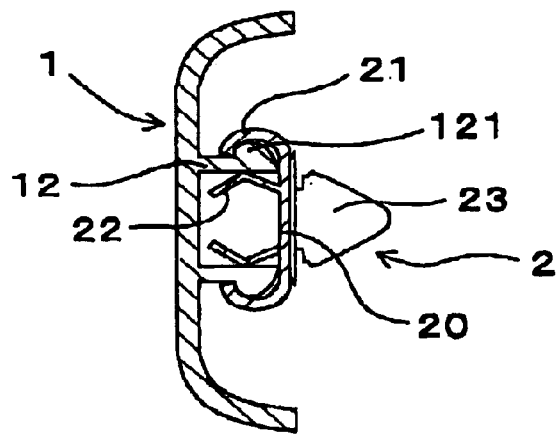
FIG. 24C is an illustrative view showing a mounting structure of a clip to a side braid taken along line B—B shown in FIG. 24A in Embodiment 6.

As shown in FIG. 24A, FIG. 24B, and FIG. 24C, in the present embodiment, the clip 2 has a pair of guide sections 25 having its interval that are substantially equal to that between the protrusions 121 of a pair of the mount ribs 12 at a side facing to the side braid 1. This guide section 25 protrudes to be higher than the latch claw 21.

In addition, the guide section 25 divides the latch claw 21 of the clip 2 into two sections at the intermediate position in the longitudinal direction, and is provided between the divided sections.

Figure 25:
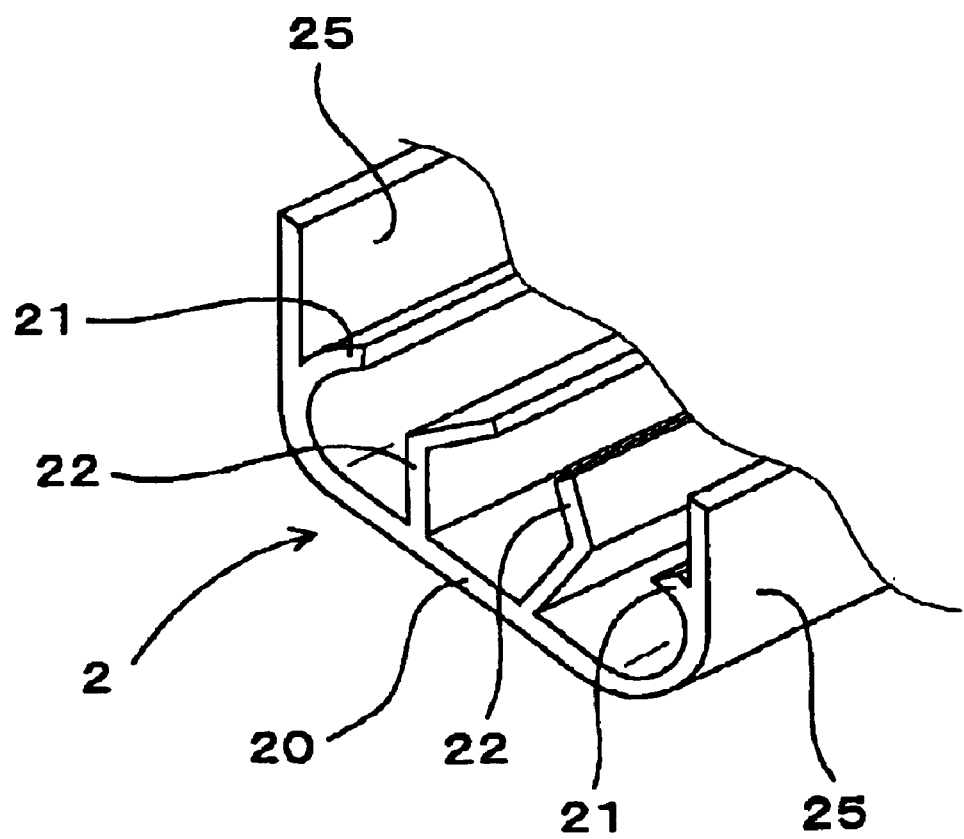
FIG. 25 is a perspective view showing a side facing to a side braid in another clip in Embodiment 6.

As shown in FIG. 25, the guide section 25 may be provided entirety at the both sides of the clip 2, and the latch claw 21 may be provided inwardly of this guide section 25.

The other elements are similar to those according to Embodiment 3.

In the present embodiment, when the clip 2 is mounted to the side braid 1, the guide section 25 or the clip 2 abuts against the protrusion 121 before the latch claw 21 of the clip 2 abuts against the protrusion 121, making it possible to guide the clip 2 from the outside of the protrusion 121 so that the protrusion 121 does not open to the outside. Thus, the mount rib 12 of the side braid 1 can be prevented from escaping to the outside by avoiding a latch between the protrusion 121 and the latch claw 21. Therefore, the latch claw 21 of the clip 2 can be easily latched at the protrusion 121 at the mount rib 12 of the side braid Otherwise, advantageous effect similar to that according to Embodiment 3 can be achieved.

Embodiment 7

Figure 26A:
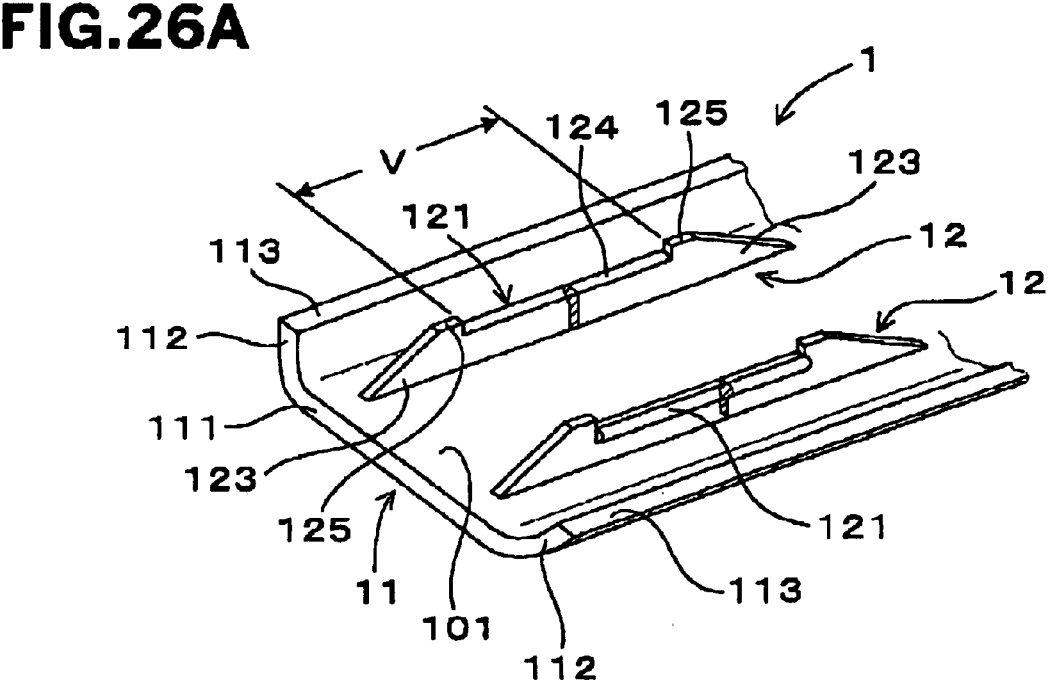
FIG. 26A is a perspective view showing a back side face of the side braid in Embodiment 7.

As shown in FIG. 26A, in the present embodiment, a pair of the mount ribs 12 in the side braid 1 has the protrusion 121, the reinforcement rib 123, a groove 124, and a protrusive section 125.

The groove 124 is formed to have a width corresponding to a width V of the clip 2 (refer to FIG. 26B), and is at a portion at which the protrusion 121 of the mount rib 12 is provided.

The protrusive section 125 is provided to be extended and protruded in a direction in which the mount rib 12 is erected at both ends of the groove 124. In addition, the reinforcement rib 123 is provided at the both ends of the mount rib 12, and is formed to have a triangular shape such that its height is lowered toward the outside tip end in the longitudinal direction.

Figure 26B:
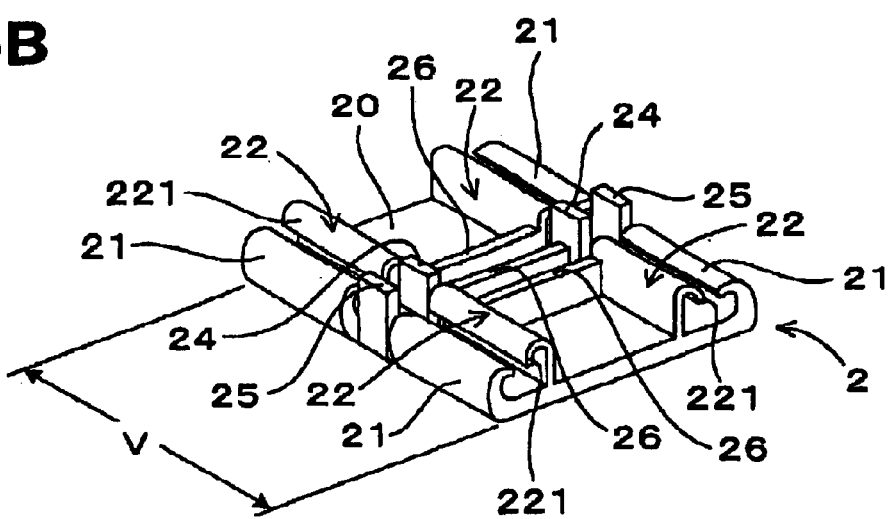
FIG. 26B is a perspective view showing a side of a clip facing to a side braid in Embodiment 7.

As shown in FIG. 26B, the clip 2 has a pair of guide sections 25 having an interval that is substantially equal to that between the protrusions 121 of a pair of the mount ribs 12 at a side facing to the side braid 1. This guide section 25 is protruded to be higher than the latch claw 21.

In addition, the guide section 25 divides the latch claw 21 of the clip 2 into two sections at an intermediate position in the longitudinal direction, and is provided between these divided sections.

The slip-proof lugs 22 is formed in J-shape and curves to be opposed to the mount ribs 12. A tip end 221 of the slip-proof lug 22 abuts against the inside face 16 of the mount rib 12 of the side braid 1.

A reinforcement section 24 is provided to face to each of a pair of guide sections 25. In addition, the reinforcement plate 26 is provided so as to cross-link a pair of slip-proof lugs 22 and a pair of reinforcement sections 24.

Figure 27A:
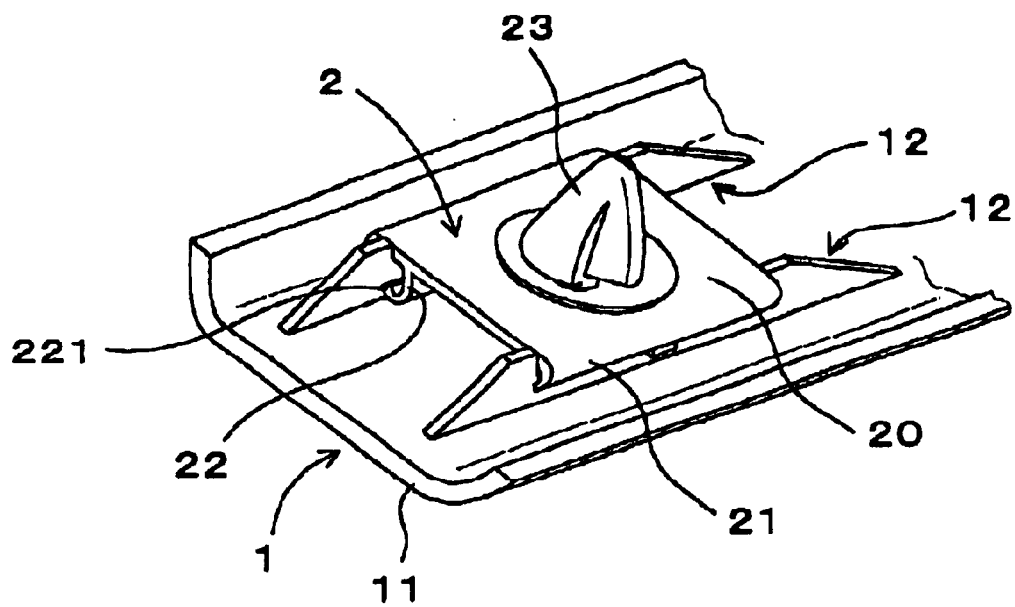
FIG. 27A is a perspective view showing a mounting structure of a clip to a side braid in Embodiment 7.

As shown in FIG. 27A, the position of the clip 2 in the longitudinal direction of the side braid 1 is fixed by engaging the clip 2 with the groove 124 of a pair of the mount ribs 12. That is, the mount rib has a position-fixing section for fixing the position of the clip 2 in the longitudinal direction, as shown in FIG. 27A. In the embodiment of FIGS. 26–28B, as shown in FIG. 28A, the fixing sections are the end faces of the protrusive sections 125 that face one another in the longitudinal direction.

Figure 27B:
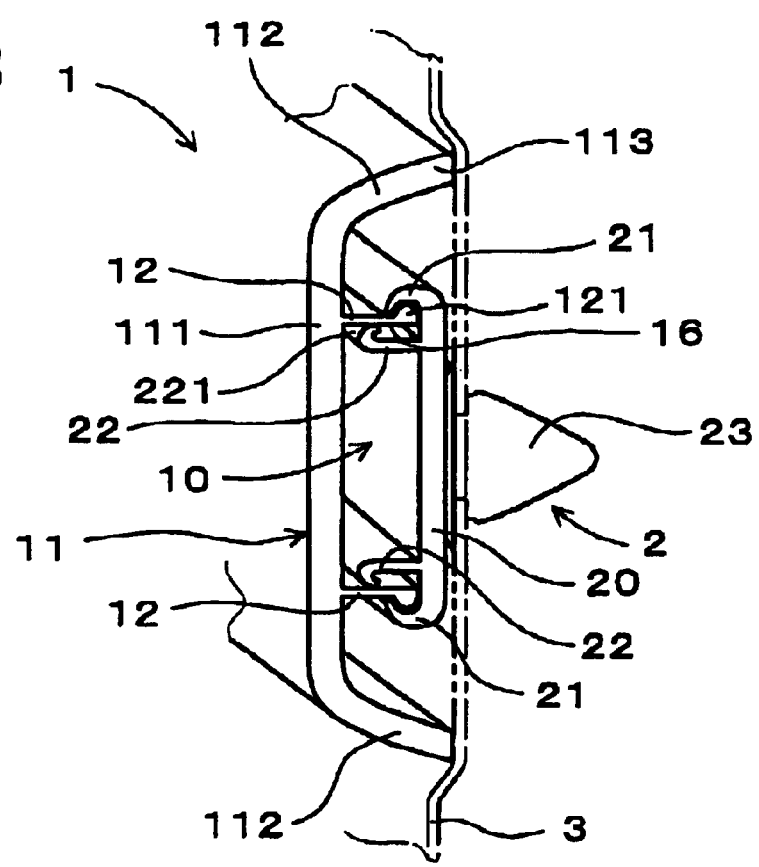
FIG. 27B is a perspective view showing a mounting structure of a clip to a side braid in Embodiment 7.

As shown in FIG. 27B, in the clip 2 mounted to the side braid 1, the mount rib 12 of the side braid 1 is pressurized so as to be pushed toward the latch claw 21 of the clip 2 by elastic force of which the tip end 221 of the slip-proof lug 22 is forced to open to the outside of the J-shape. In this manner, the protrusion 121 of the mount rib 12 is not slipped off the latch claw 21.

Figure 28A:
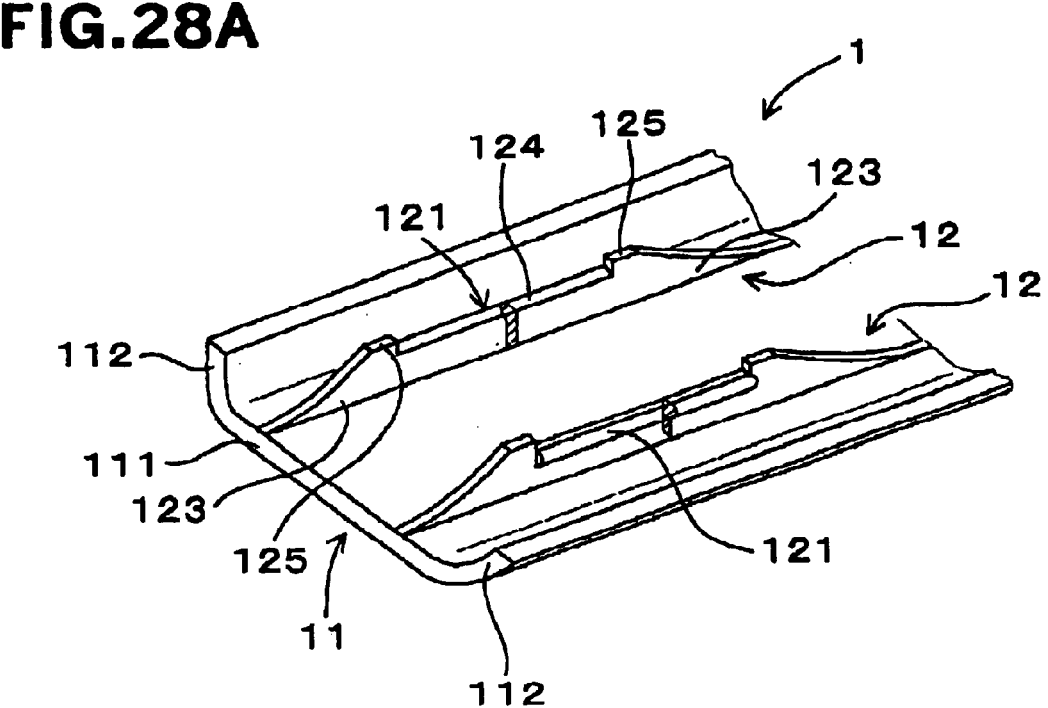
FIG. 28A is a perspective view showing a back face side of another side braid in Embodiment 7.

As shown in FIG. 28A, the reinforcement rib 123 may be provided to have an arc-like triangle shape so that its height is gradually changed to be gently lowered toward the outside tip end in the longitudinal direction.

Figure 28B:
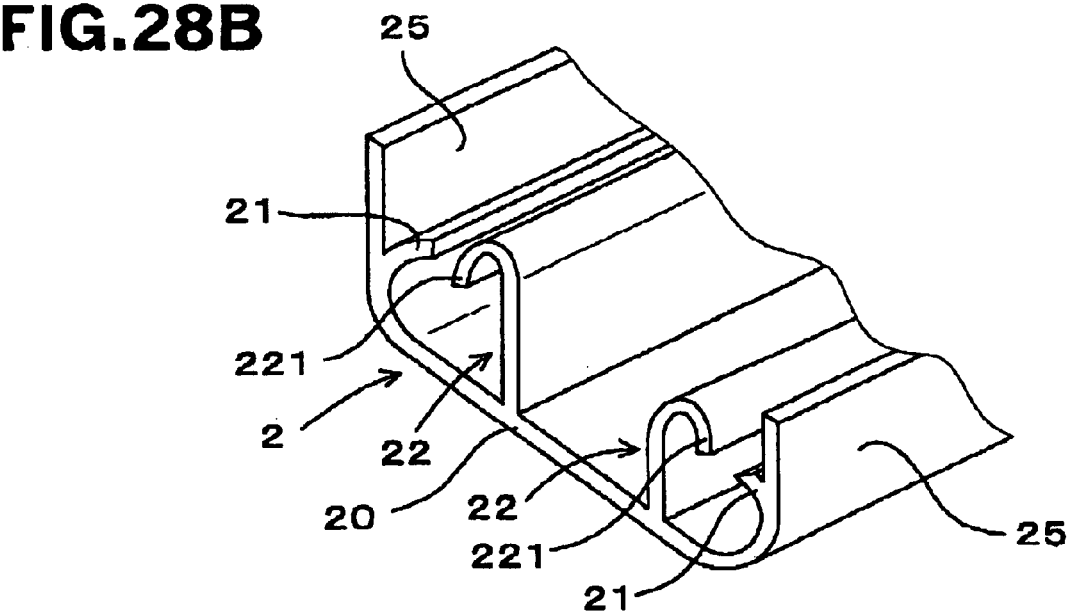
FIG. 28B is a perspective view showing a side facing to a side braid in another clip in Embodiment 7.

As shown in FIG. 28B, the clip 2 may be a J-shaped slip-proof lug 22, and the guide section 25 is provided entirely at both ends of the clip 2, and thus the latch claw 21 may be provided inwardly at the guide section 25.

The other elements are similar to those according to Embodiment 3.

In the present embodiment, the position of the clip 2 in the longitudinal direction of the side braid 1 can be securely fixed. Thus, after the side braid 1 has been mounted to the body panel 3, the side braid 1 can be prevented from being displaced in the forward and backward direction of a vehicle.

Otherwise, advantageous effect similar to that according to Embodiment 3 can be achieved.

Embodiment 8

Figure 29:
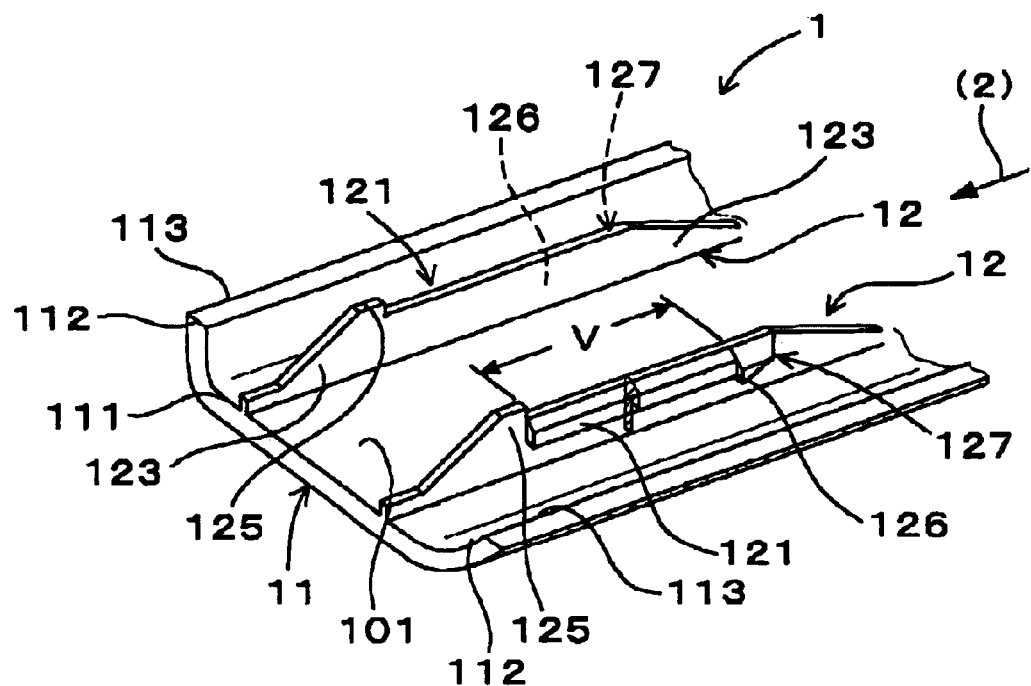
FIG. 29 is a perspective view showing a back side Race of the side braid in Embodiment 8.

As shown in FIG. 29, a protrusion 121 at the mount rib 12 of the side braid 1 in the present embodiment has a stepped section 126 protruded more than the protrusion 121 in the vicinity of one end in the longitudinal direction. In addition, an inclined face 127 in which a protrusion quantity is gradually decreased as the protrusion is closer from the stepped section 126 to the end 120 is provided between the stepped section 126 and an end 120.

In the present embodiment, the inclined face 127 includes an upper face 127A, a side face 127B, and a lower face 127C at the inclined section formed between the stepped section 126 and the end 120. The stepped section 126 is protruded more outwardly than the protrusion 121 (refer to FIG. 30A), and is protruded to the side of the main body 11 (refer to FIG. 31B).

Figure 30A:
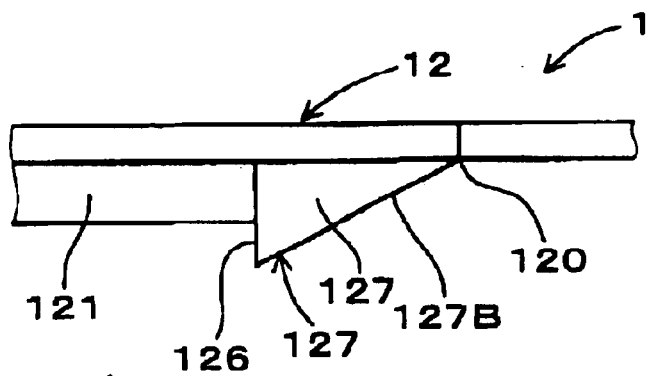
FIG. 30A is a plan view showing a stepped section and inclined face in Embodiment 8.
Figure 30B:
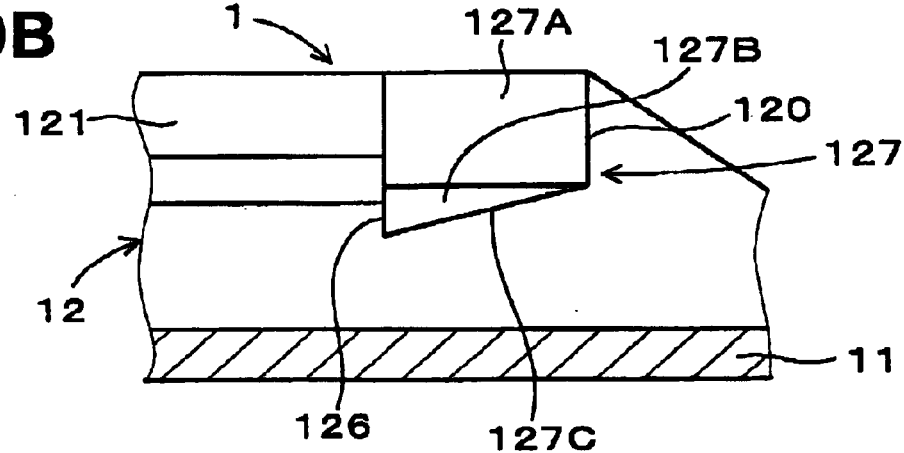
FIG. 30B is a front view showing a stepped section and inclined face in Embodiment 8.

As shown in FIG. 30A, the protrusion quantity of the inclined face 127 is gradually reduced as the protrusion is closer from the stepped section 126 to the end 120, and finally, the quantity becomes zero at the end 120. That is, the inclined face 127 at the end 120 has the same thickness as the reinforcement rib 123.

In addition, in the vicinity of the other end 120 in the longitudinal direction of the mount rib 12, the reinforcement rib 123 has the protrusive section 125 protruding higher than the reinforcement rib 123. The stepped section 126, inclined face 127, and protrusion 125 are provided symmetrically in pairs. The end faces of the protrusive sections 125, which face the longitudinal direction, are fixing surfaces for fixing the position of the clip 2 in the longitudinal direction. Corresponding side surfaces, or fixing surfaces, of the clip 2 engage the fixing surfaces of the protrusive sections 125 to fix the clip 2 longitudinally.

A width between the stepped section 126 and the protrusive section 125 is formed to be equal to the width V of the clip 2 (refer to FIG. 26B).

The other elements are similar to Embodiment 3.

In the present embodiment, it is possible that when the clip 2 is mounted to the side braid 1, the latch claw 21 of the clip 2 is mounted on the inclined face and slides from the end 120 toward the stepped section 126 in the longitudinal direction (refer to the arrow in FIG. 29). Thus, in comparison with a case in which the clip 2 is mounted from a direction facing to the side braid 1, a quantity of which the mount rib 12, latch claw 21, and slip-proof lug 22 is elastically deformed is reduced. Thus, the clip 2 can be mounted to the side braid 1 easily.

Figure 30C:
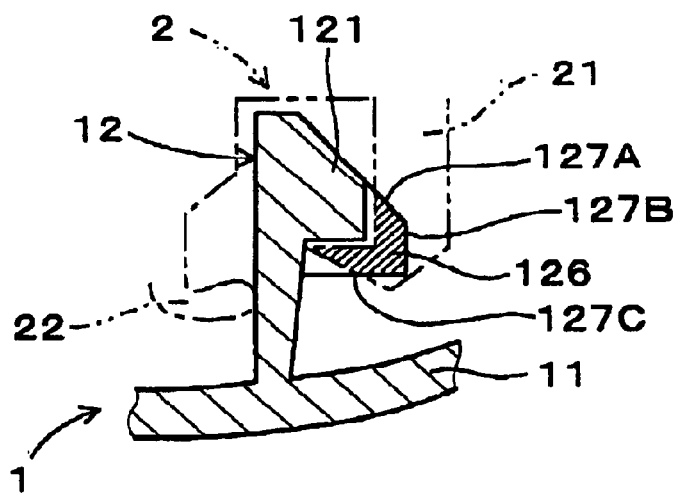
FIG. 30C is a sectional view showing a stepped section and an inclined face in Embodiment 8.

Then, after the clip 2 has been mounted to the side braid 1, the clip 2 is housed between the stepped section 126 and the protrusive section 125. In addition, one end of the clip 2 is latched at the protrusive section 125, and the latch claw 21 at the other end of the clip 2 is latched at the stepped section 126 (refer to FIG. 30C), thereby enabling positioning in a longitudinal direction.

Figure 31:
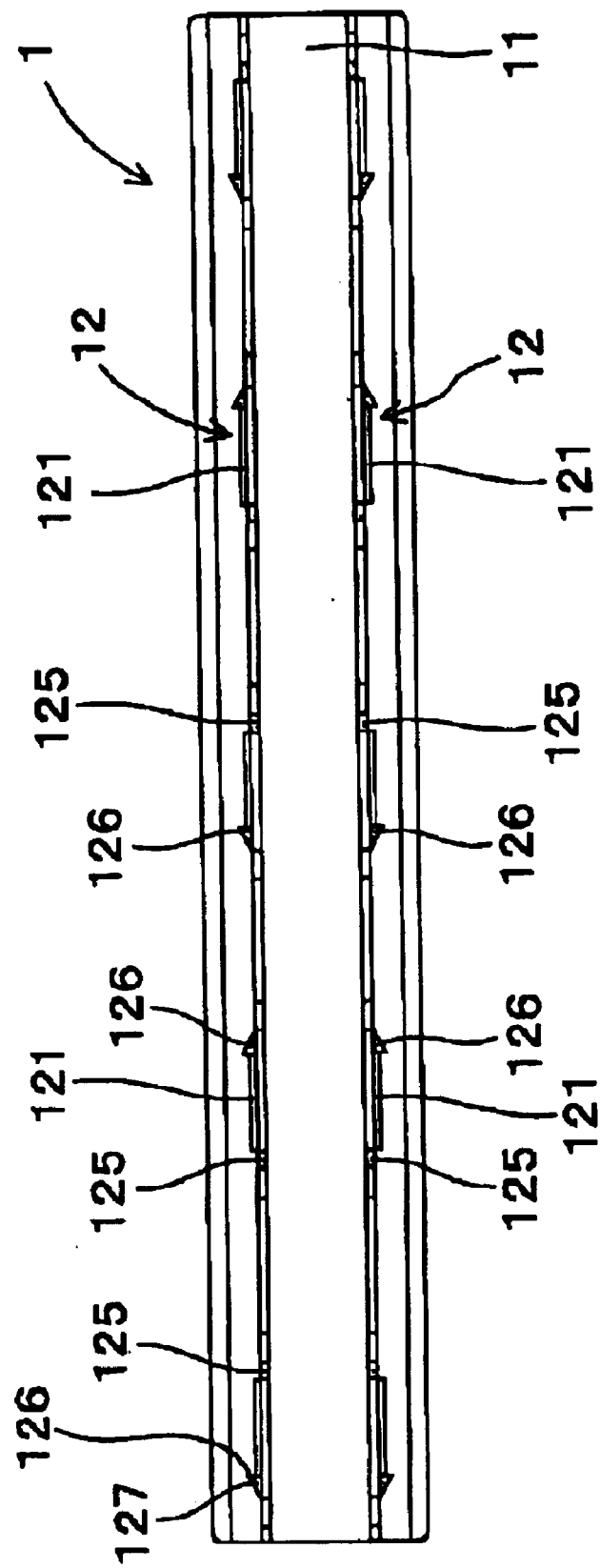
FIG. 31 is a plan view showing disposition of a stepped portion and a protrusive section on the back side face of the side braid in Embodiment 8.
Figure 32A:
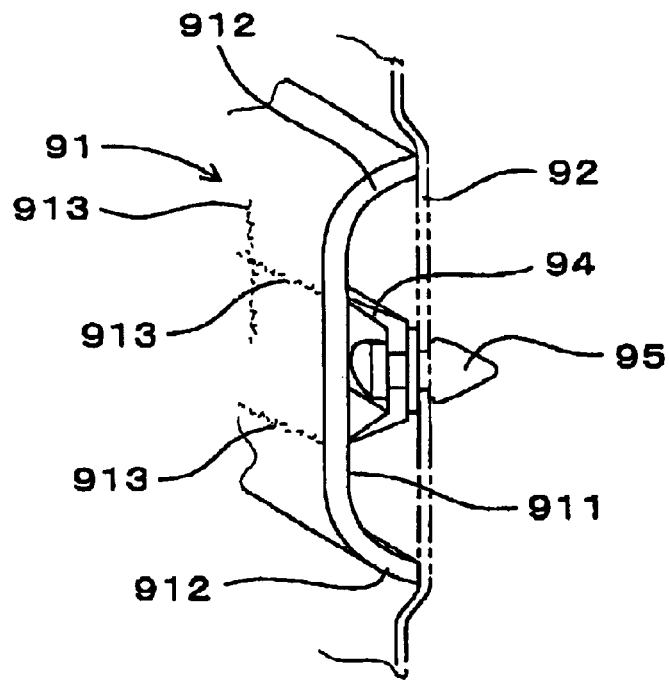
FIG. 32A is an illustrative view showing a mounting structure of a side braid having a mount stay provided thereat in a conventional example.
Figure 32B:
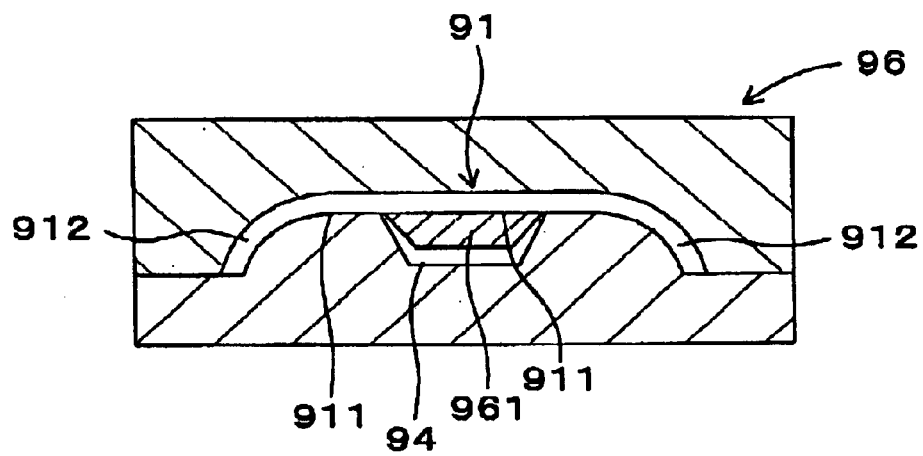
FIG. 32B is an illustrative view illustrating a mount die of the side braid having the mount stay provided thereat in the conventional example.
Figure 33:
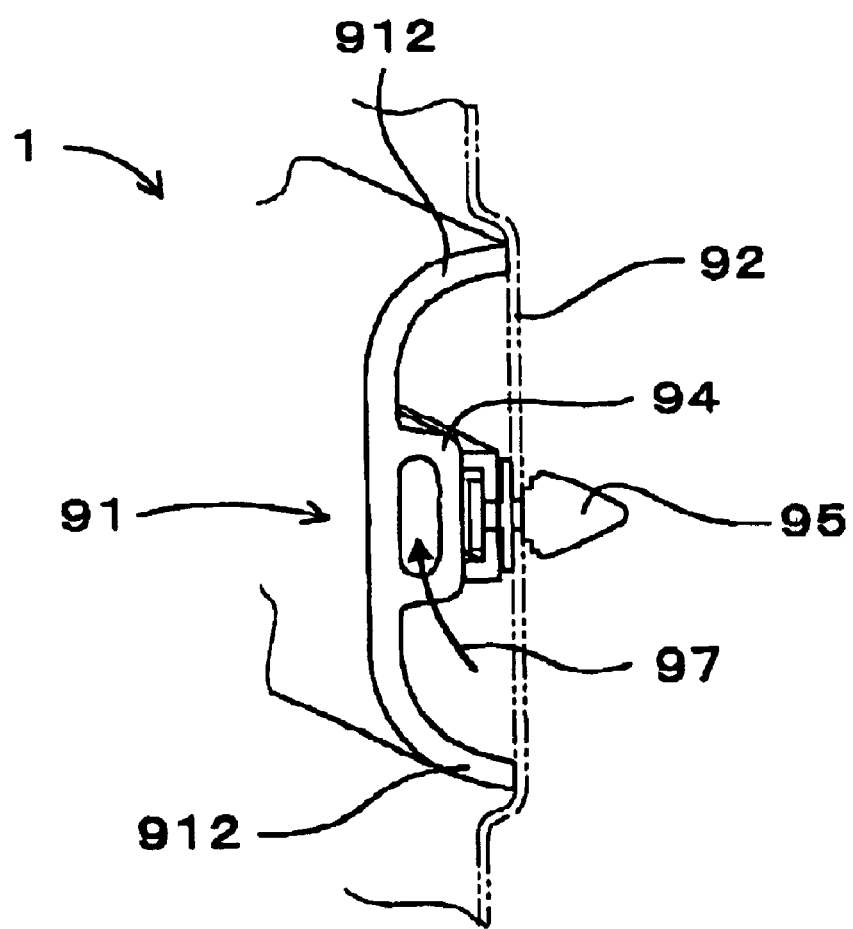
FIG. 33 is an illustrative view illustrating a mounting structure of the side braid in which a mount stay is provided by blowing a gas in the conventional example.

As shown in FIG. 31, in the present embodiment, in the case where the stepped section 126 is provided in the vicinity of one end of the mount rib 12, the stepped section 126 is provided in the vicinity of the other end in the adjacent mount ribs 12, whereby the stepped section 126 is provided alternately in the longitudinal direction. In this manner, when the side braid 1 having the clip 2 mounted thereto is mounted to the body panel 3, a latch between one end of the clip 2 and the protrusive section 125 and a latch between the latch claw 21 at the other end of the clip 2 and the stepped section 126 act in any longitudinal direction, whereby uniform strength can be provided.

Otherwise, advantageous effect similar to that according to Embodiment 3 can be achieved.

Obviously, numerous modifications and variations of the present invention are possible in light of the above teachings. It is therefore to be understood that, within the scope of the appended claims, the invention may be practiced otherwise than as specifically described here.

What is claimed is:

1. A mounting structure of a resin molded article, wherein the resin molded article comprises an elongated main body and a plurality of clip mounting sections formed intermittently along a longitudinal direction, each clip mounting section is composed of a pair of mount ribs facing each other, each mount rib has a protrusion, and each protrusion protrudes from an outside face of the corresponding mount rib, wherein:

the resin molded article is mounted to a body panel with a clip corresponding to a position of the mount ribs, the clip has a latch claw to be latched to one of the protrusions, a slip-proof lug provided opposite to the latch claw to prevent the latch claw from slipping from the one protrusion, and an engagement portion engaged with the body panel at a side opposite to the body panel;

pthe latch claw of the clip is latched at the one protrusion to be mounted to the resin molded article, and the engagement portion of the clip is mounted to the body panel, thereby mounting the resin molded article to the body panel;

at least one of the mount rib and the latch claw has a first position-fixing section surface, and the clip has a corresponding second fixing surface, and the first fixing surface engages the second fixing surface for fixing a position of the clip in at least one longitudinal direction of the resin molded article;

each mount rib is joined to the elongated main body at a proximal end, and the thickness of the proximal end of each mount rib is less than the thickness of the elongated main body; and each mount rib includes a reinforcement rib for improving the strength of the resin molded article, wherein each reinforcement rib forms a longitudinal end of the corresponding mount rib, and each reinforcement rib is inclined such that the distance by which each reinforcement rib extends from the resin molded article increases in a direction from the longitudinal end of the mount rib toward the center of the mount rib.

2. A mounting structure of a resin molded article as claimed in claim 1, wherein the clip has a reinforcement sections section facing inside faces of the mount ribs, wherein the reinforcement sections are located on a side of the clip that faces the resin molded article.

3. A mounting structure of a resin molded article as claimed in claim 1, wherein the clip has a pair of guide sections, wherein a distance between the guide sections is equal to or greater than a distance between the protrusions of the pair of the mount ribs, and wherein the guide sections are located at a side of the clip that faces the resin molded article, and the guide sections protrude further than the latch claw.

4. A mounting structure of a resin molded article as claimed in claim 1, wherein each of the mount ribs has a groove that corresponds to the width of the clip, the clip is engaged with the groove, and the position of the clip in the longitudinal direction of the resin molded article is fixed.

5. A mounting structure of a resin molded article as claimed in claim 1, wherein the protrusion comprises a stepped section that protrudes outwardly in a lateral direction and is located in the vicinity of at least one end of one of the mount ribs.

6. A mounting structure of a resin molded article as claimed in claim 5, wherein an inclined face is provided between the stepped section and the at least one end, wherein a degree of protrusion of the inclined face gradually decreases towards the at least one end.

* * * * *